United States Patent
McManus

(10) Patent No.: US 7,143,914 B2
(45) Date of Patent: Dec. 5, 2006

(54) LATCHING RACK SYSTEM FOR VEHICLES

(76) Inventor: David M. McManus, 4951 Willow Way, Elk Grove, CA (US) 95758

(*) Notice: Subject to any disclaimer, the term of this patent is extended or adjusted under 35 U.S.C. 154(b) by 398 days.

(21) Appl. No.: 10/778,739

(22) Filed: Feb. 13, 2004

(65) Prior Publication Data

US 2005/0179241 A1  Aug. 18, 2005

(51) Int. Cl.
*B60R 9/00* (2006.01)
*B60R 11/00* (2006.01)

(52) U.S. Cl. ............... 224/519; 224/520; 224/535; 224/530; 224/525

(58) Field of Classification Search ............ 224/519, 224/520, 535, 529, 524, 525, 530
See application file for complete search history.

(56) References Cited

U.S. PATENT DOCUMENTS

| | | | |
|---|---|---|---|
| 3,831,982 A * | 8/1974 | Bernhardt et al. | 280/511 |
| 3,953,064 A * | 4/1976 | McHenry | 292/184 |
| 4,915,276 A | 4/1990 | Devito | |
| 5,090,718 A * | 2/1992 | Kauffman | 280/402 |
| 5,382,109 A * | 1/1995 | Nyman | 403/316 |
| 5,529,231 A | 6/1996 | Burgess | |
| 6,129,371 A | 10/2000 | Powell | |
| 6,234,509 B1 * | 5/2001 | Lara | 280/425.2 |
| 6,401,999 B1 | 6/2002 | Hehr | |
| 6,623,025 B1 | 9/2003 | McCoy et al. | |
| 6,874,804 B1 * | 4/2005 | Reese et al. | 280/477 |
| 6,887,027 B1 * | 5/2005 | O'Leary et al. | 414/462 |
| 2004/0004099 A1 * | 1/2004 | Crouch | 224/499 |

OTHER PUBLICATIONS

Draw-Tite Class III/IV & V Ball Mounts, Drawtite Hitch web site: Jan. 6, 2004, www.drawtite-hitches.com/hitch_accessories/draw_bars_c3_c4.htm; 3 pages.
Draw-Tite Class III & IV Specialty Ball Mounts; Drawtite Hitch web site Jan. 6, 2004, www.drawtite-hitches.com/hitch_accessories/ball_mounts_special.htm; 3 pages.
BallMounts: trailer hitch bike rack and trailer hitches etrailer web site: Jan. 6, 2004, www.etrailer.com/Merchant2, 7 pages.
Trailer Towing Drawbars, Ball Mounts And Hitch Balls; Accessconnect web site: Jan. 6, 2004, www.accssconnect.com/trailer_towing_drawbars_hitch_ball.htm, 4 pages,.

* cited by examiner

*Primary Examiner*—Jes F. Pascua
*Assistant Examiner*—Lester L. Vanterpool
(74) *Attorney, Agent, or Firm*—John P. O'Banion

(57) ABSTRACT

A latching rack system for carrying objects on a vehicle that is compatible with a standard receiver hitch. A latching rack platform has a standard hitch ball and a support mast with a latch pin and a shank to couple to a receiver hitch. A mating latching rack post incorporates a hitch ball cup and a latch device to securely couple to the latching rack platform. The weight of the rack and the objects carried is supported on the hitch ball and lateral support is provided by the support mast. The latching rack post can be mounted and dismounted without touching the latching rack platform or the receiver. The hitch ball is available for towing when the latching rack assembly is dismounted. The latching rack post can be integrated into objects to be carried to allow quick and easy mounting and dismounting.

28 Claims, 19 Drawing Sheets

LATCHING RACK SYSTEM FOR VEHICLES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to exterior racks that attach to a vehicle, and more particularly to a latching rack system that attaches to a receiver hitch on a vehicle.

2. Description of Related Art

Many vehicles, such as cars, trucks, vans and sports utility vehicles, are equipped with a receiver hitch for towing trailers or supporting exterior racks or accessories. The receiver hitch socket provides a strong and secure method to mount a variety of accessories, carriers or racks at the rear of a vehicle. The access to the receiver opening is difficult for many, however. In order to install a ball mount or a rack, the user must align a square shank with the receiver opening for insertion. This can be difficult if the rack is heavy or if the user must bend down to the level of the receiver. Once the shank is aligned and inserted, a lock pin must be placed in the receiver socket and through the shank. The location of the lock pin aperture is typically under the rear of the vehicle where the user must assume a crouching posture that exposes them to dirt, grime, grease or wetness on the underside of the vehicle from the road or ground environment. For users with disabilities or joint problems, this posture and procedure is impossible and they must seek assistance. The ball mount or rack is also exposed to dirt, grime, grease or wetness from the road or ground environment during use. Each time a user desires to change or remove the ball mount or rack, they must access the receiver lock pin and handle the ball mount or rack. The difficulty of these procedures encourages users to leave their racks attached even when not in use which imposes a public nuisance when walking around the vehicle. Users who find the swapping of dirty, heavy ball mounts and receiver racks difficult, inconvenient or impossible desire a better system.

Most existing receiver rack systems are designed for a single purpose, such as a bicycle carrier or a ski rack. Typically the ball mount or receiver opening must be accessed to change to a different rack.

One type of popular rack is equipped with a square horizontal shank at the bottom that fits directly into the receiver hitch socket. In order to install the rack, the user must support the rack and align the shank precisely to insert into the receiver opening. This is difficult with a heavy cumbersome rack. Swapping the rack with a ball mount is necessary to change from rack support to towing a trailer with the associated problems discussed above.

Another popular rack type fastens to a ball mount, typically by screwing the hitch ball over a horizontal flange at the bottom of the rack. This configuration requires the user to simultaneously hold and align the rack while tightening the nut with a wrench under the hitch ball with the ball mount inserted. Alternately, the flange is installed on the ball mount first with a wrench and then with the rack attached, the ball mount is inserted into the receiver as described above. Again, the user is exposed to a cumbersome process and conditions on the underside of the vehicle. Additionally, horizontal flanges as the sole support element of a rack are subject to flexing due to strong lateral and torsional forces and oscillations during vehicle operation which results in severe swaying of the rack and load.

Some racks use a releasable flange on the ball mount to remove the rack from the ball mount or tilt the rack for convenience. To mount or dismount the rack, the ball mount must be accessed. Releasable flange racks typically use removable pins or bolts to connect the post to the flange near the ball mount. These pins are subject to loss and allow vibration and oscillation of the rack during vehicle operation. The ball mount is handled again to remove the flange or change the type of rack.

A further problem with existing racks is lifting heavy objects up and onto a mounted vehicle rack. Users of devices such as wheel chairs or walker aids may not be physically able to lift the device vertically and onto a rack for transport. Other objects are too heavy or cumbersome for a person to safely lift off the ground. For this reason, receiver racks have not been developed for some objects too heavy or cumbersome to lift and secure on a mounted rack.

Another problem associated with many hitch mounted racks is the need to secure the object onto the rack after the object is mounted. This typically requires manipulating straps, cords or clamps. This process is time consuming and sometimes requires repositioning the object and reaching into difficult areas to access. This process must be repeated each time an object is loaded or unloaded from the rack.

A still further problem is that most existing receiver rack systems are designed for larger vehicles. Small vehicles with limited trunk space are ignored when they have the greatest need to attach objects.

Accordingly, there exists a need for a rack system that minimizes or eliminates the need to repeatedly access ball mounts, receiver openings and the underside of a vehicle to mount racks, swap equipment between different racks or change between a towing configuration and a rack configuration. Furthermore a need exists for a rack system that is interchangeable between different rack uses and is easy for a user to mount and dismount from a vehicle. Still further, there is a need for a rack system that can mount and dismount an object reliably and repeatedly without excessive strapping or clamping. Still further, a need exists for a rack system that will securely carry a load without excessive sway or vibration during vehicle operation. And further, a need exists for a rack system that can conveniently mount and dismount heavy or cumbersome objects.

BRIEF SUMMARY OF THE INVENTION

The present invention is a latching rack system that couples to a standard receiver hitch. A latching rack platform has a standard hitch ball and a support mast and is initially coupled to a receiver hitch. A latching rack assembly incorporates a hitch ball cup and a latch device to securely couple to the latching rack platform. The weight of the rack and the object is supported on the hitch ball and lateral support is provided by the support mast. The latching rack assembly can be mounted and dismounted without touching the latching rack platform or the receiver. The hitch ball is available for towing when the latching rack assembly is dismounted. The latching rack assembly can be integrated into objects to be carried to allow quick and easy mounting and dismounting utilizing the ball hitch as a lever for minimizing the object's dead-lift weight. The invention satisfies the needs recited above and is capable of integration with objects to be carried as will be described below.

An aspect of the invention is a latching rack system for supporting objects and configured to couple to a hitch receiver on a vehicle.

Another aspect of the invention is a latching rack platform with a shank, a hitch ball a hitch ball platform and a lateral support base.

A still further aspect of the invention is a latching rack post with a hitch ball cup and a latch device.

A further aspect of the invention is the latching rack post is configured to carry objects when the latching rack platform is coupled to the hitch receiver, the hitch ball cup is positioned on the hitch ball, and the latch device is releasably coupled to the lateral supporting means.

A yet further aspect of the invention is a latching rack platform with a support mast, two support flanges and a latch pin configured to support a latching rack.

Another aspect of the invention is a latching means with at least one latch device with claws and a release lever positioned to couple to the latch pin on the latching rack platform.

A further aspect of the invention is a latching rack system with two latch devices.

A still further aspect of the invention is a latching rack post with a lateral support bracket with lateral support flanges and positioned to slidingly align with the lateral support base on the latching rack platform.

Another aspect of the invention is an alignment slot in the hitch ball cup.

A further aspect of the invention is a latching rack post with a circular cross section.

A still further aspect of the invention is a latching rack post with a rectangular cross section.

Another aspect of the invention is a hitch ball cup that is interchangeable.

A further aspect of the invention is a latching rack system adapted to carry a bicycle, a pair of skis, a snowboard, a golf bag cart, a wheel chair, a walker, a suitcase, a cargo carrier, an equipment container, a cooking grill, or a utility cart on a vehicle.

A still further aspect of the invention is a latching rack system configured with two latching rack platforms and adapted to support two latching rack posts.

A yet further aspect of the invention is a latching rack system with two latching racks coupled together and configured to latch to two latching rack platforms simultaneously.

Another aspect of the invention is an easy method of mounting and demounting a latching rack system.

A further aspect of the invention is the integration of a latching rack post into an object to be carried.

A still further aspect of the invention is to incorporate wheels, stands or handles on the object to be carried to facilitate mounting a latching rack system.

A yet further aspect of the invention is a ball mount platform that can be left in place for towing.

Another aspect of the invention is a latching rack system that can be mounted and dismounted from a hitch ball platform without accessing the hitch ball platform.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 16. It will be appreciated that the apparatus may vary as to configuration and as to details of the parts, and that the method may vary as to the specific steps and sequence, without departing from the basic concepts as disclosed herein.

Figure 1:
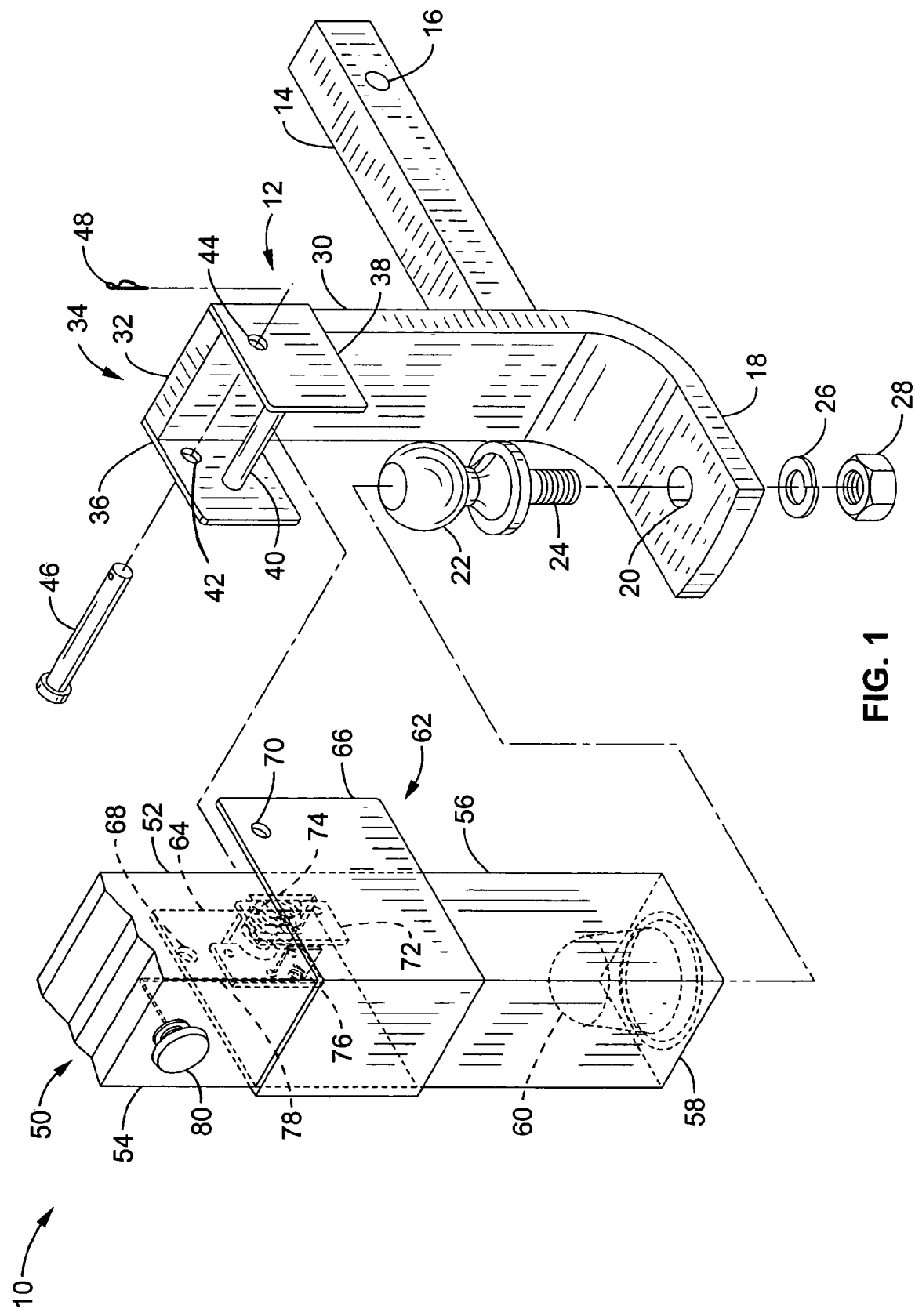
FIG. 1 is an illustration of a latching rack system with a latching rack platform and a latching rack assembly.

FIG. 1 illustrates the two primary components of a latching rack system 10. First, latching rack system 10 has a latching rack platform 12 that includes a square steel shank 14 and receiver pin aperture 16 configured to insert and couple to a standard vehicle receiver hitch (not shown). Shank 14 is preferably 1¼ inch square for certain loads and objects and is preferably 2 inches square for other loads and objects. Other size shanks or shank adapters can be used to couple shank 14 to a vehicle receiver. Ball platform 18 is configured as a standard ball platform as is known in the art, and in this embodiment, is made from a ½ inch thick by 2 inch wide bar of steel bent to 90 degrees and welded to shank 14 to provide a ball drop of about 2 inches. Ball platform 18 has an aperture 20 to receive a standard hitch ball 22. Hitch ball 22 has threaded stem 24, that couples to lock washer 26 and nut 28 to secure hitch ball 22 to ball platform 18. Hitch ball 22 can have different ball diameters based on the towing needs of the user. Typical hitch ball diameters are 1⅞ inch, 2 inch and 2 5/16 inch. In another embodiment (not shown), ball platform 18 is elongated horizontally and configured with two apertures to accommodate two hitch balls for the purpose of simultaneous rack support and towing. In a further embodiment (see FIG. 16), multiple ball platforms are coupled on a horizontal support bar to accommodate two or more hitch balls for multiple rack systems.

Latching rack platform 12 has support mast 30 oriented vertically upward and coupled to ball platform 18 and shank 14. Ball platform 18 and support mast 30 are preferably provided as one component of bar steel and welded to shank 14 but, in another embodiment, are provided as separate components and welded together. In a preferred embodiment, support mast 30 is made of a ½ inch thick by 2 inch wide bar of steel and rises about 6 inches above the top of shank 14. In an exemplary embodiment (not shown), ball platform 18 and support shaft 30 are coupled to shank 14 with means to adjust the ball drop distance, such as regular spaced apertures in a channel bar and locking pins.

Positioned at the top portion 32 of support mast 30 is lateral base assembly 34. In the configuration shown in FIG. 1, lateral base assembly 34 has left flange 36 and right flange 38, welded to support mast 30, but may be fastened by other means. Left and right flanges 36, 38 are made of stiff metal and preferably steel to withstand lateral and torsional forces generated during vehicle operation. Flanges 36, 38 can be formed from one component or multiple components. In a preferred embodiment, left and right flanges 36, 38 are configured as metal plates measuring about 2 inches vertical and about 3 inches horizontal. A latch pin 40 is welded horizontally between flanges 36, 38. Locking pin apertures 42, 44 are positioned in flanges 36, 38 to receive locking pin 46 which is secured with pin clip 48. Support mast 30 and lateral base assembly 34 are positioned to not interfere with towing operations using hitch ball 22.

In an exemplary embodiment (not shown), support mast 30 and lateral base assembly 34 are oriented perpendicular to shank 14 for certain loads and objects. In another embodiment (not shown), flanges 36, 38 are configured so that locking pin apertures 42, 44 are positioned on the opposite side of support mast 30 from latch pin 40. In a further embodiment (not shown) flanges 36, 38 are hingedly coupled to support mast 30 and adapted to articulate behind support mast 30 when not in use. In a still further embodiment (not shown), lateral base assembly 34 is releasably coupled to support mast 30 and can be removed when not in use. In another embodiment (not shown), latching rack platform 12 is adapted for a receiver hitch on the front of a vehicle. In a further embodiment (not shown) one or more latch pins 40 are positioned in a slot cut in support mast 30. It is to be understood that support mast 30 and lateral base assembly 34 may be retrofit onto an existing hitch ball platform, such as those commercially available for hitch receivers and including adjustable hitch ball platforms.

Second, latching rack system 10 has a latching rack assembly 50 configured to mate with latching rack platform 12 and to carry loads or objects when latching rack platform 12 is coupled to a vehicle receiver hitch (not shown). Latching rack assembly 50 has a hollow metal post 52 with an upper end 54 and a lower end 56. Post 52 is shown here in a square configuration as a preferred embodiment for certain loads and objects. Upper end 54 can be attached to a rack or form part of a load carrying rack. Lower end 56 is coupled by welding or other means to ball cup flange 58 which contains ball cup 60 shown in phantom. Ball cup 60 has a hemispherical bowl adapted to fit snugly over hitch ball 22 and an opening that flares to a round opening larger in diameter than the diameter of hitch ball 22. Ball cup 60 is adapted to fit on hitch ball 22 and to support the base of post 52 on the upper surfaces of hitch ball 22 when post 52 is at an angle between about 45 degrees and about 90 degrees with respect to ball platform 18. Ball cup 60 is preferably configured to fit a particular hitch ball diameter but more preferably configured to fit a range of hitch ball diameters. In an exemplary embodiment (not shown), ball flange 58 and ball cup 60 are configured to be interchangeable on post 52.

A lateral support bracket 62 is coupled to post 52, preferable by welding, and positioned to align with lateral base assembly 34 when hitch ball cup 60 is on hitch ball 22 and post 52 is positioned about parallel to support mast 30. Lateral support bracket 62 includes left and right post flanges 64, 66 of stiff metal, preferably steel. Post flanges 64, 66 are adapted to slide along the outside of flanges 36, 38 and to fit snugly against flanges 36, 38 when post 52 is about parallel to support mast 30 to provide lateral and torsional resistance for latching rack assembly 50. Apertures 68, 70 in post flanges 64, 66 align with apertures 42, 44 in flanges 36, 38. Lateral support bracket 62 is preferably fabricated of one component as shown or fabricated of two or more components. Lateral support bracket 62 preferably extends below lateral base assembly 34 to provide alignment assistance when attaching latching rack assembly 50 to latching rack platform 12. In an exemplary embodiment (not shown), post flanges 64, 66 are flared out at the lower corners to assist in alignment.

Thus far, pin 46 has been described as the latch mechanism to secure latching rack platform 12 to latching rack assembly 50 (object support structure). In another preferred embodiment, the latch mechanism further includes at least one releasable, spring-loaded latch device 72 is positioned in a recess in post 52 to align with latch striker bolt 40 when ball cup 60 is on hitch ball 22 and post 52 is parallel with support mast 30. Latch device 72 is preferably commercially available, such as a car door latch, and mounted to post 52 by conventional means. Latch device 72 has one or more spring-loaded claws 74 that close and firmly lock around striker bolt 40 upon contact and slight force against latch pin 40. Claws 74 remain locked on latch pin 40 until released. Latch device 72 provides resistance to downward and cantilever forces on post 52 and vibration dampening during vehicle operation. Latch device 72 has release lever 76 that will release claws 74 when deflected. In another embodiment (not shown), latch device 72 has one or more articulating forks to lock around latch pin 40. Release cord 78 is connected to release lever 76 inside post 52 at one end and to release handle 80 positioned outside post 52 at the other end. In a preferred embodiment shown in FIG. 1, two latch devices 72 are used side by side to provide additional torsional resistance and vibration dampening. In a further embodiment (not shown) the position of latch device 72 on post 56 is adjustable to align with different platforms 18, hitch balls 22 and/or different lengths of support masts 30.

Latching rack system 10 is configured to carry loads when latching rack assembly 50 is positioned on hitch ball 22 and latch device 72 is latched to latch striker bolt 40. Locking pin 46 is inserted in apertures 42, 44, 68, 70 to prevent accidental disengagement if latch device 72 is inadvertently released.

Figure 2:
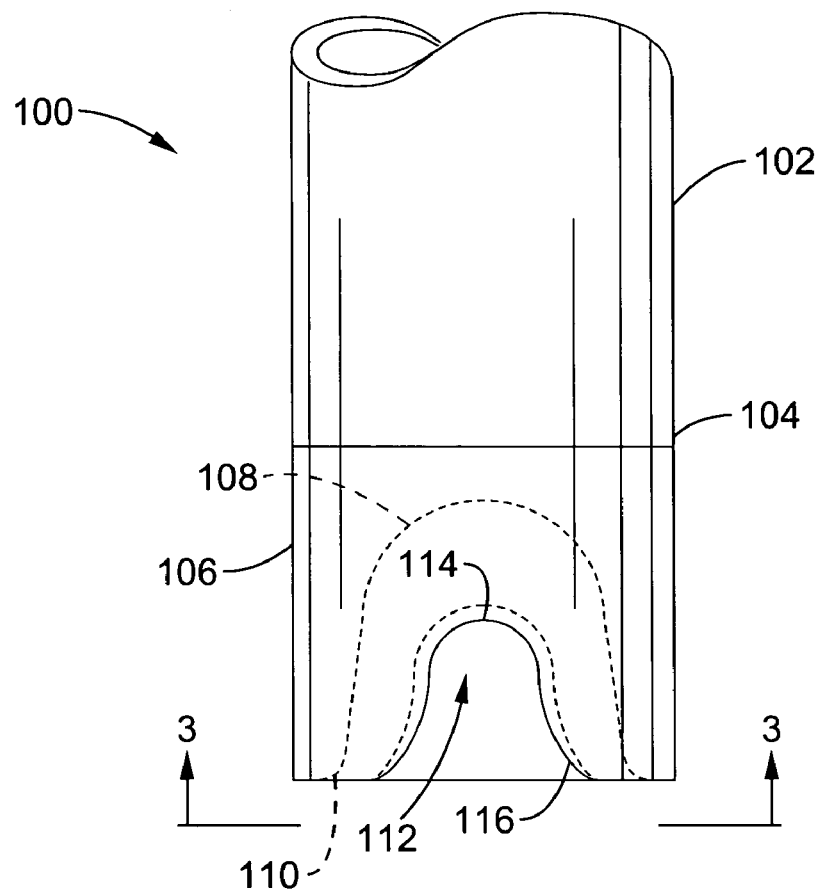
FIG. 2 is an elevation view of a ball cup fitting of an embodiment of a latching rack assembly.
Figure 3:
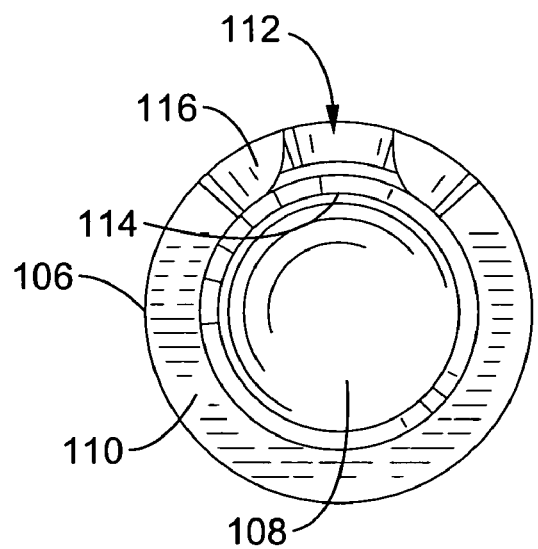
FIG. 3 is an end view of the ball cup fitting shown in FIG. 2.
Figure 4A:
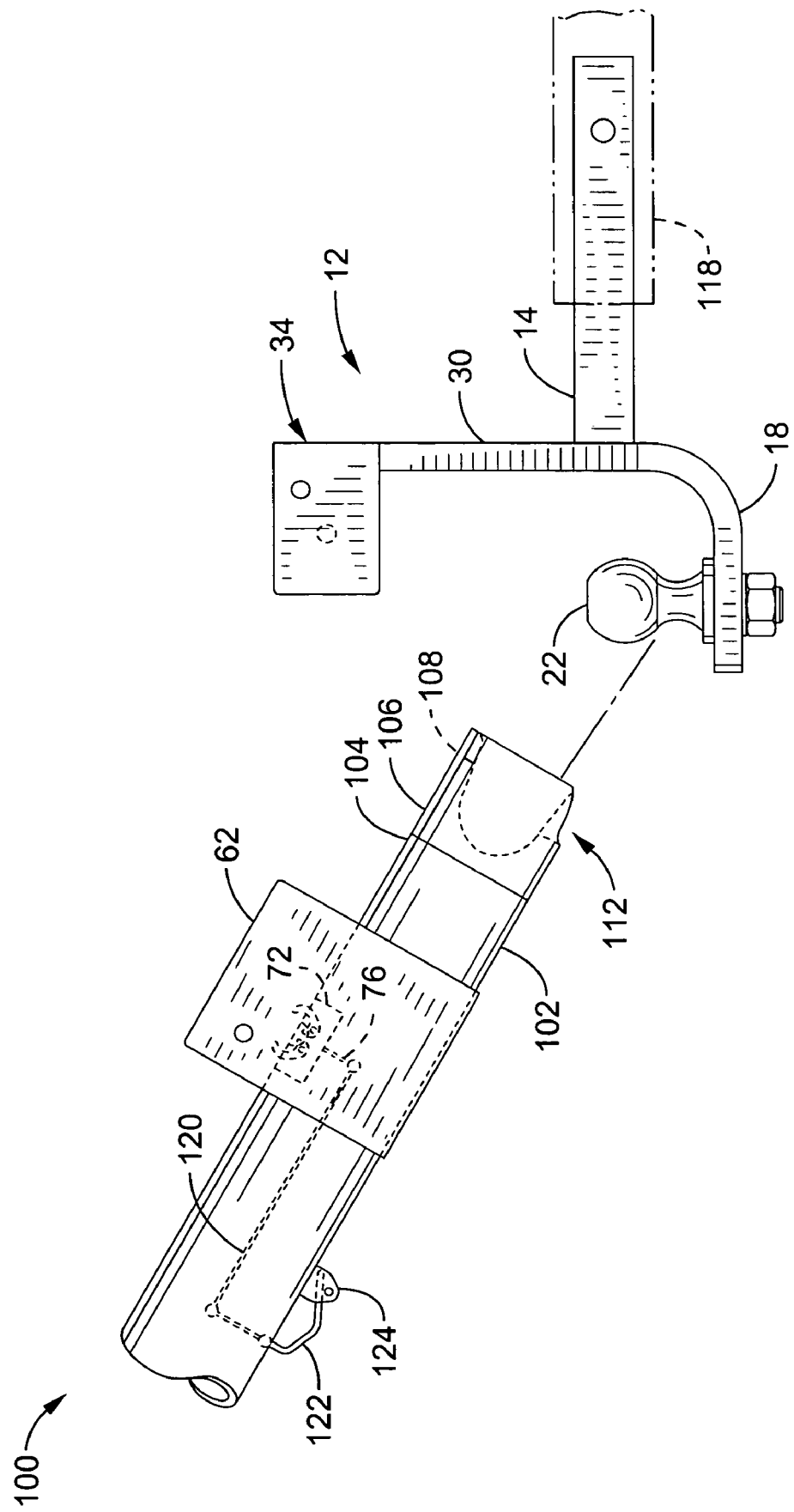
FIG. 4A illustrates aligning the latching rack assembly shown in FIG. 2 to a latching rack platform for mounting.
Figure 4B:
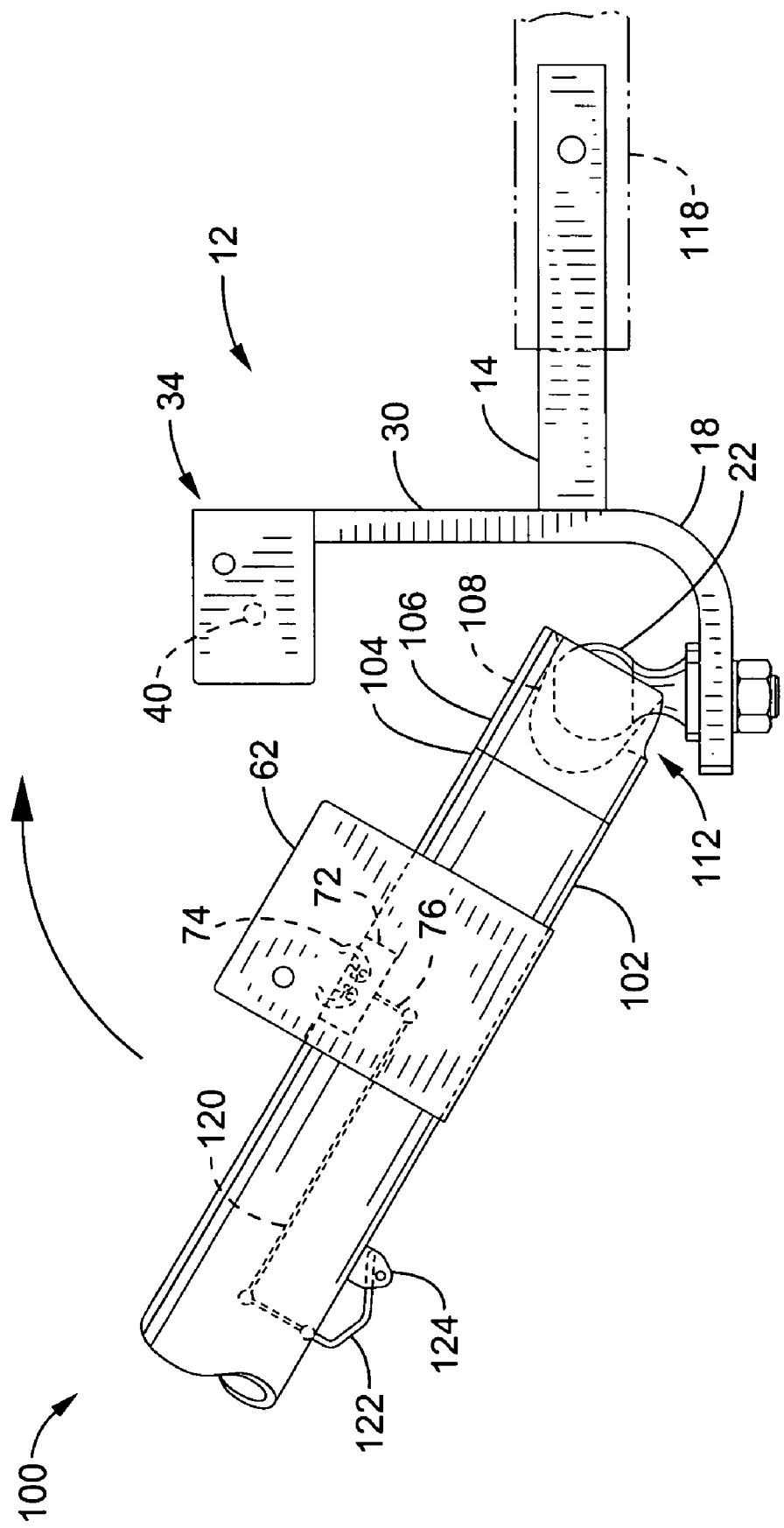
FIG. 4B illustrates positioning the ball cup of the latching rack assembly shown in FIG. 4A on the hitch ball of the latching rack platform.
Figure 4C:
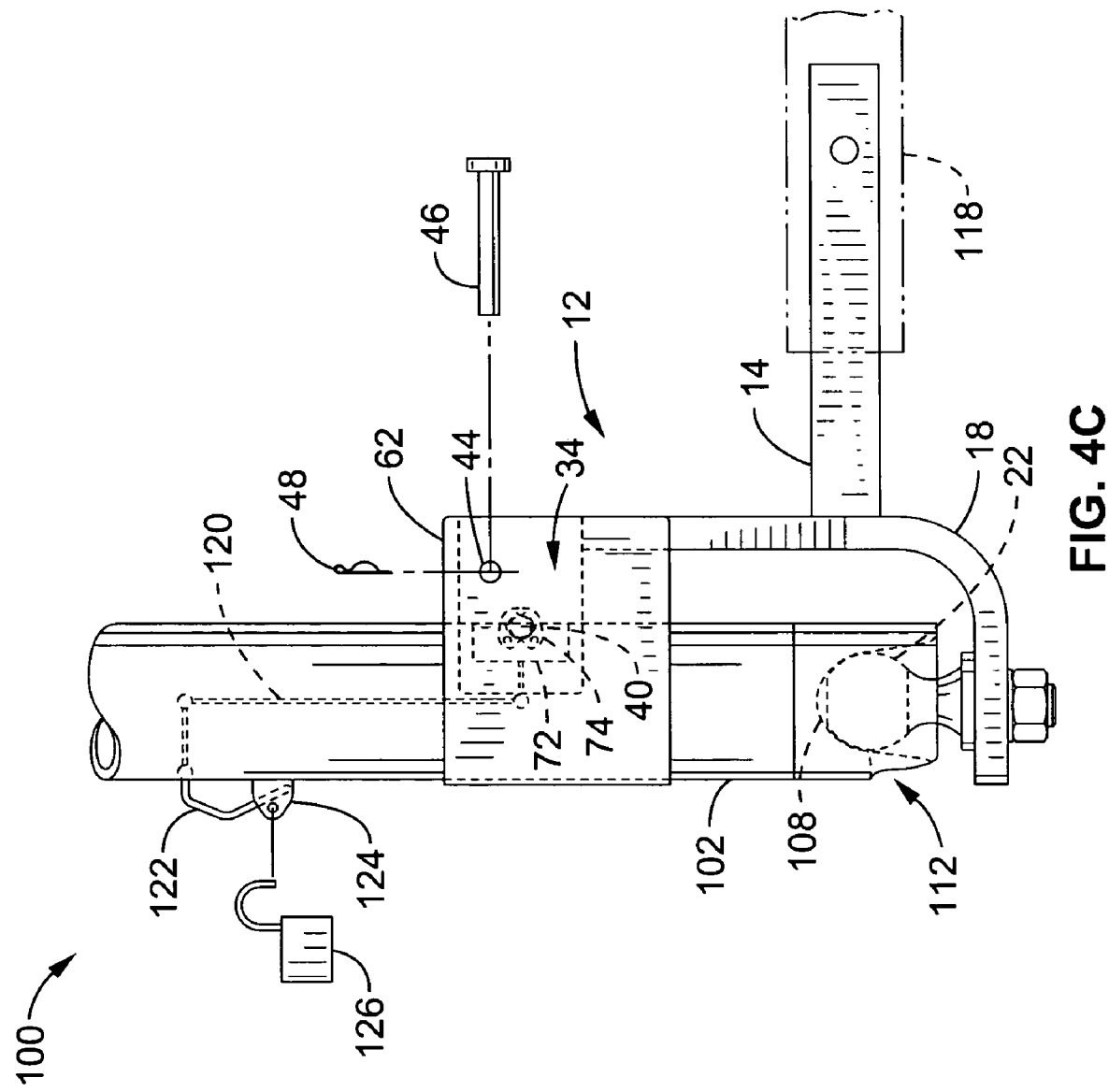
FIG. 4C is a cross section view of the latching rack assembly in FIG. 4A and FIG. 4B mounted to the latching rack platform.

FIG. 2 and FIG. 3 illustrate an elevation view and an end view of the lower portion of another embodiment of a latching rack assembly 100 consisting of a round, hollow metal post 102 with a lower end 104. A round post 102 is preferred for carrying certain loads or objects. A ball cup fitting 106 is coupled to the lower end 104 of post 102, preferably by welding. Ball cup fitting 106 has ball cup 108 with a hemispherical cup and flared skirt 110. Alignment slot 112 is positioned in ball cup fitting 106 to generally face away from support mast 30 (see FIG. 1) when rack assembly 100 is aligned for latching. The width of alignment slot 112 is slightly larger than the width of the neck of a hitch ball (see FIG. 1). The top arch 114 of alignment slot 112 aligns at about the equator of a hitch ball inserted in the cup. Alignment slot 112 is configured to allows ball cup fitting 106 to engage a hitch ball (as shown in FIG. 4A to FIG. 4C), when post 102 is positioned at an angle between about zero degrees and about 90 degrees relative to the ball platform (shown in FIG. 1). Alignment slot 112 has flared edges 116 to assist in alignment of ball cup 108 with a hitch ball.

In another embodiment (not shown) ball cup fitting 106 is slidingly coupled to post 102 through a jack screw or other adjustable means. In a further embodiment (not shown), latching rack assembly 100 is provided with a resilient covering to enclose lateral support bracket 62 and latch device 72 for safety or aesthetics.

FIG. 4A through FIG. 4D illustrate the mounting and dismounting of latching rack assembly 100 shown in FIG. 2 and FIG. 3 on latching rack platform 12 as shown previously in FIG. 1. Latching rack platform 12 has shank 14, ball platform 18 with hitch ball 22, and support mast 30 with lateral base assembly 34 and is coupled to a receiver hitch 118 shown in phantom. Latching rack assembly 100 has post 102 with ball cup fitting 106 coupled at bottom end 104, lateral support bracket 62 and latch device 72. Latch device 72 has claws 74 and release lever 76. Release lever 76 is attached to rod 120 which cooperates with trigger 122 hingedly attached to post 102. A locking bracket 124 is positioned to lock trigger 122 against post 102.

In FIG. 4A, latching rack assembly 100 is positioned with ball cup fitting 106 oriented towards hitch ball 22 and alignment slot 112 facing down.

In FIG. 4B, ball cup 108 is positioned on hitch ball 22 with alignment slot 112 aligned with the neck of hitch ball 22. The weight of latching rack assembly 100 keeps ball cup 108 on hitch ball 22 while post 102 is aligned with support mast 30 and lateral base assembly 34. Post 102 is articulated vertically on hitch ball 22 and towards lateral base assembly 34 in the direction of the arrow until claws 74 of latch device 72 contact and secure latch striker bolt 40.

FIG. 4C illustrates latching rack assembly 100 and latching rack platform 12 in the mounted position. Latching rack assembly 100 is coupled to latching rack platform 12 with post 102 supported directly on hitch ball 22 through ball cup 108. Claws 74 of latch device 72 securely grasp latch pin 40. Lateral base assembly 34 slidingly mates with lateral support bracket 62. Locking pin 46 is inserted in apertures 42, 44, 68, 70 (shown in FIG. 1) to prevent inadvertent release of latch device 72 and secured with pin clip 48. A padlock 126 is inserted in locking bracket 124 to prevent unauthorized movement of trigger 122 and release of latch device 72.

In this mounted configuration, hitch ball 22 resists downward and cantilever forces through ball cup 108. Latch device 72 resists downward, cantilever and torsional forces, dampens vibration and prevents ball cup 108 from disengaging hitch ball 22. Lateral base assembly 34 slidingly mates with lateral support bracket 62 and resists lateral and torsional forces exerted on latching rack assembly 100 during vehicle operation.

Figure 4D:
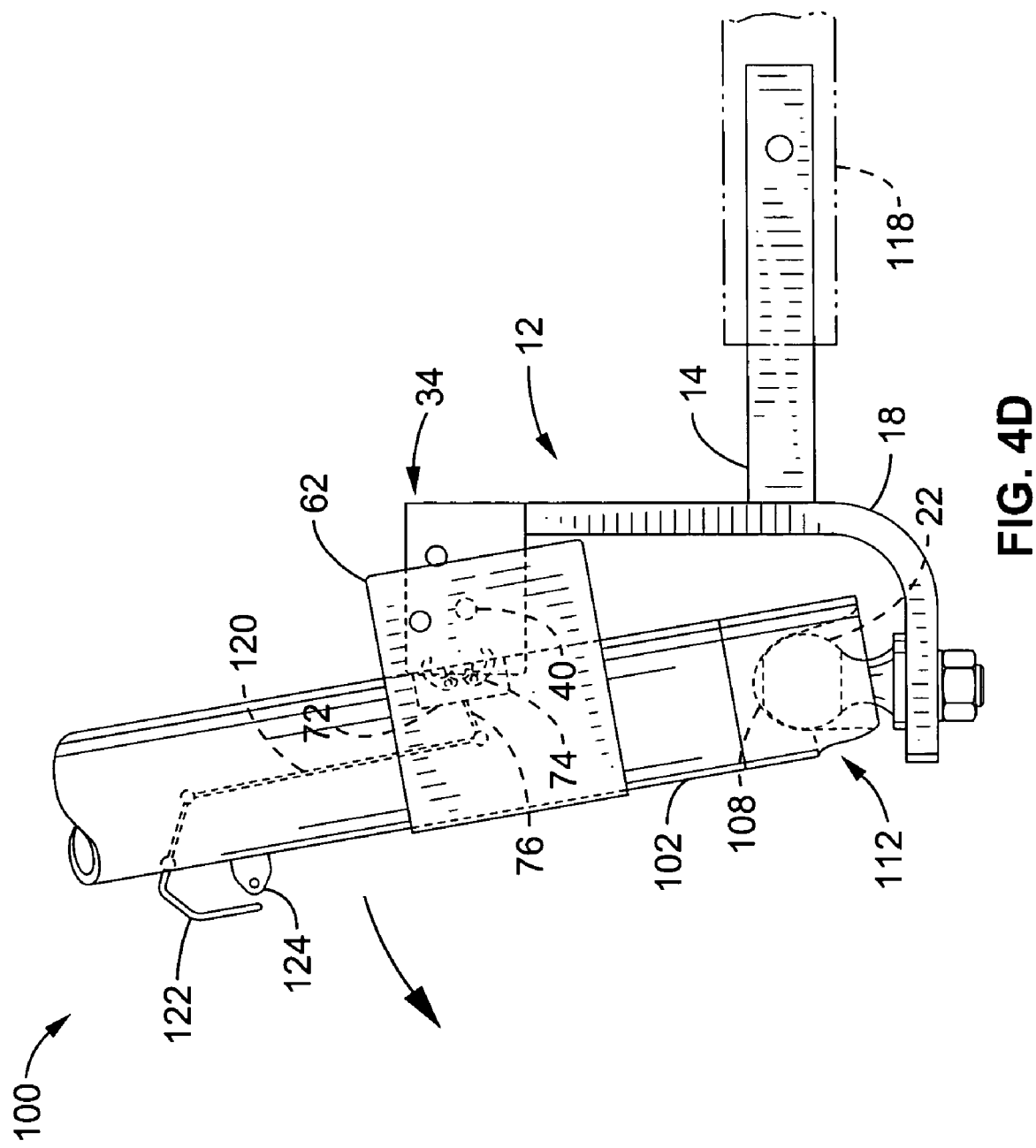
FIG. 4D illustrates the dismounting of the latching rack assembly shown in FIG. 4A through FIG. 4C from the latching rack platform.

FIG. 4D illustrates dismounting latching rack assembly 100 from latching rack platform 12 as shown in FIG. 4A through FIG. 4C. Padlock 126 is removed from locking bracket 124. Locking pin 46 (not shown) is removed from apertures 42, 44, 68, 70. Trigger 122 is rotated up moving rod 120 down, moving release lever 76 down and releasing claws 74 on latch pin 40. Post 102 is articulated backward from the vehicle on hitch ball 22 as shown by the arrow. Latching rack platform 12 may be left in place for remounting post 102 or towing service. It is to be understood that wheels, stands or brackets may be attached to latching rack assembly 100 to aid in mounting and dismounting from hitch ball 22. Further, objects integrated with latching rack assembly 100 may have wheels, stands or brackets to aid in mounting and dismounting latching rack assembly 100.

Figure 5:
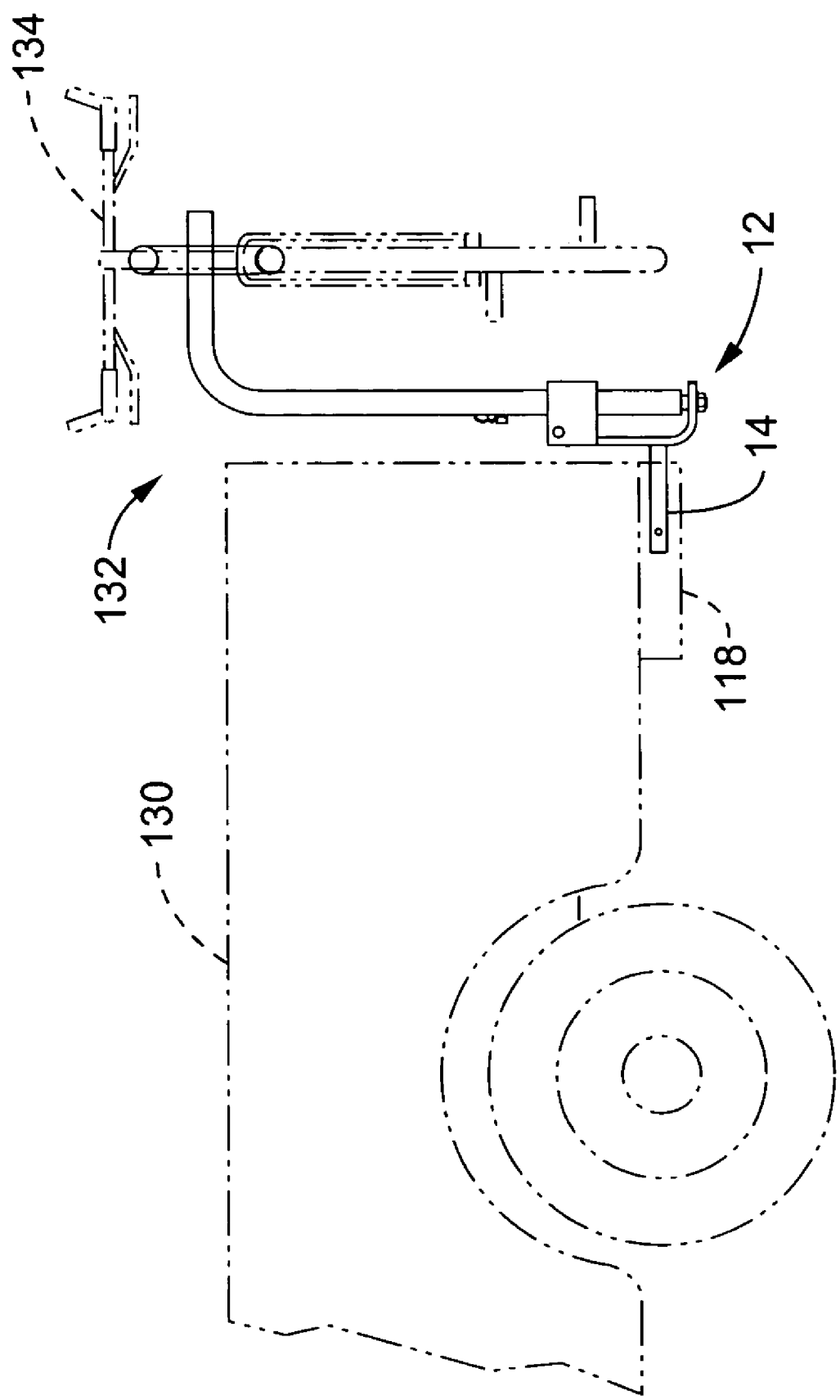
FIG. 5 illustrates an embodiment of the invention configured as a latching bike rack.

FIG. 5 through FIG. 15 illustrate various intended uses of the invention. FIG. 5 illustrates an embodiment of the invention as it would be used with vehicle 130 and configured as a latching bike rack 132. Latching bike rack 132 supports bike 134 and couples to vehicle 130 with shank 14 of latching rack platform 12 inserted in receiver hitch 118, shown in phantom. In another embodiment (not shown), a modified latching rack platform is mounted on a stand or garage wall to accommodate latching bike rack 132 and store bike 134 securely and efficiently.

Figure 6:
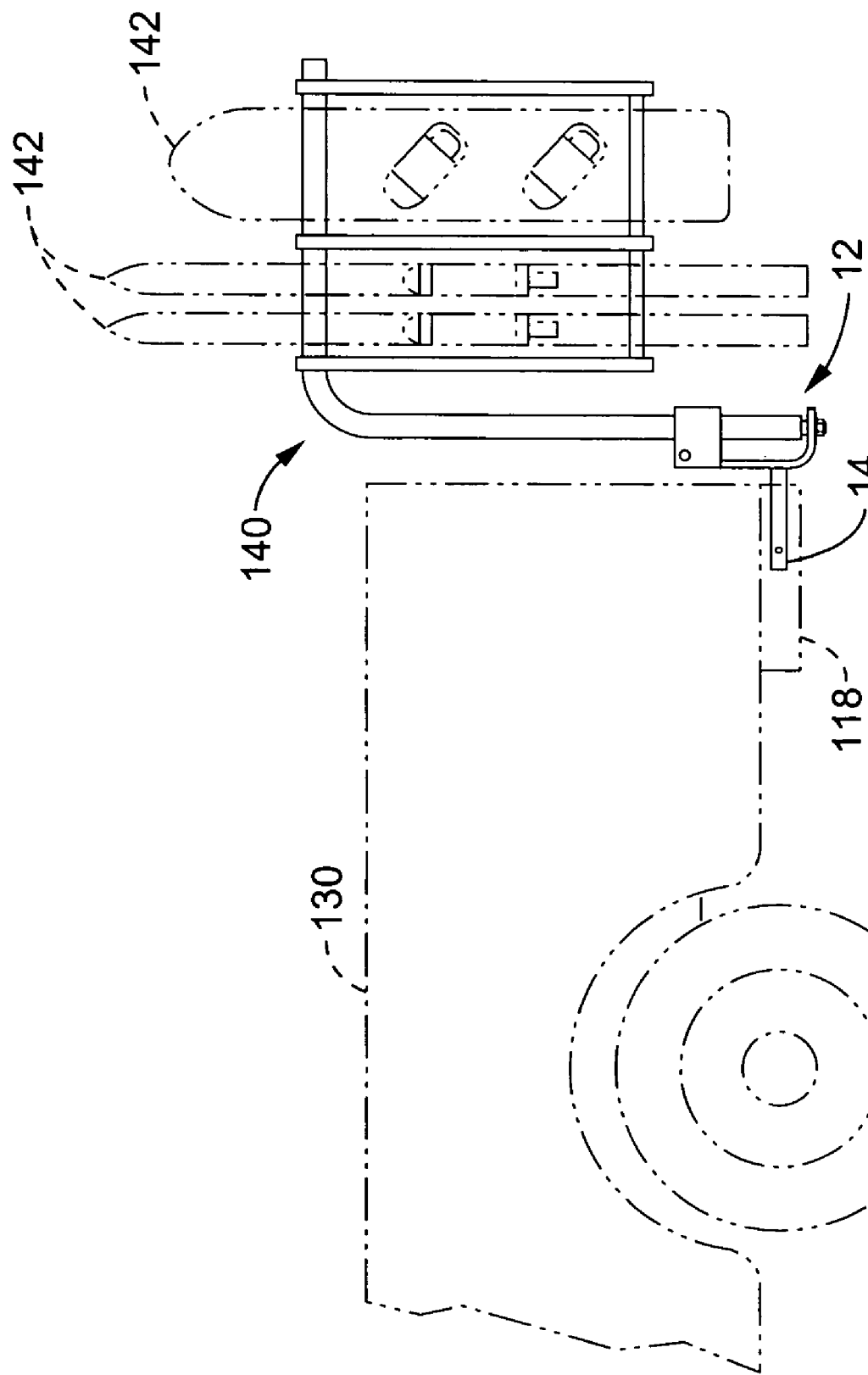
FIG. 6 illustrates an embodiment of the invention configured as a latching sports rack.

FIG. 6 illustrates another embodiment of the invention shown in FIG. 5 configured as a sports rack 140 adapted to support sports equipment 142.

Figure 7:
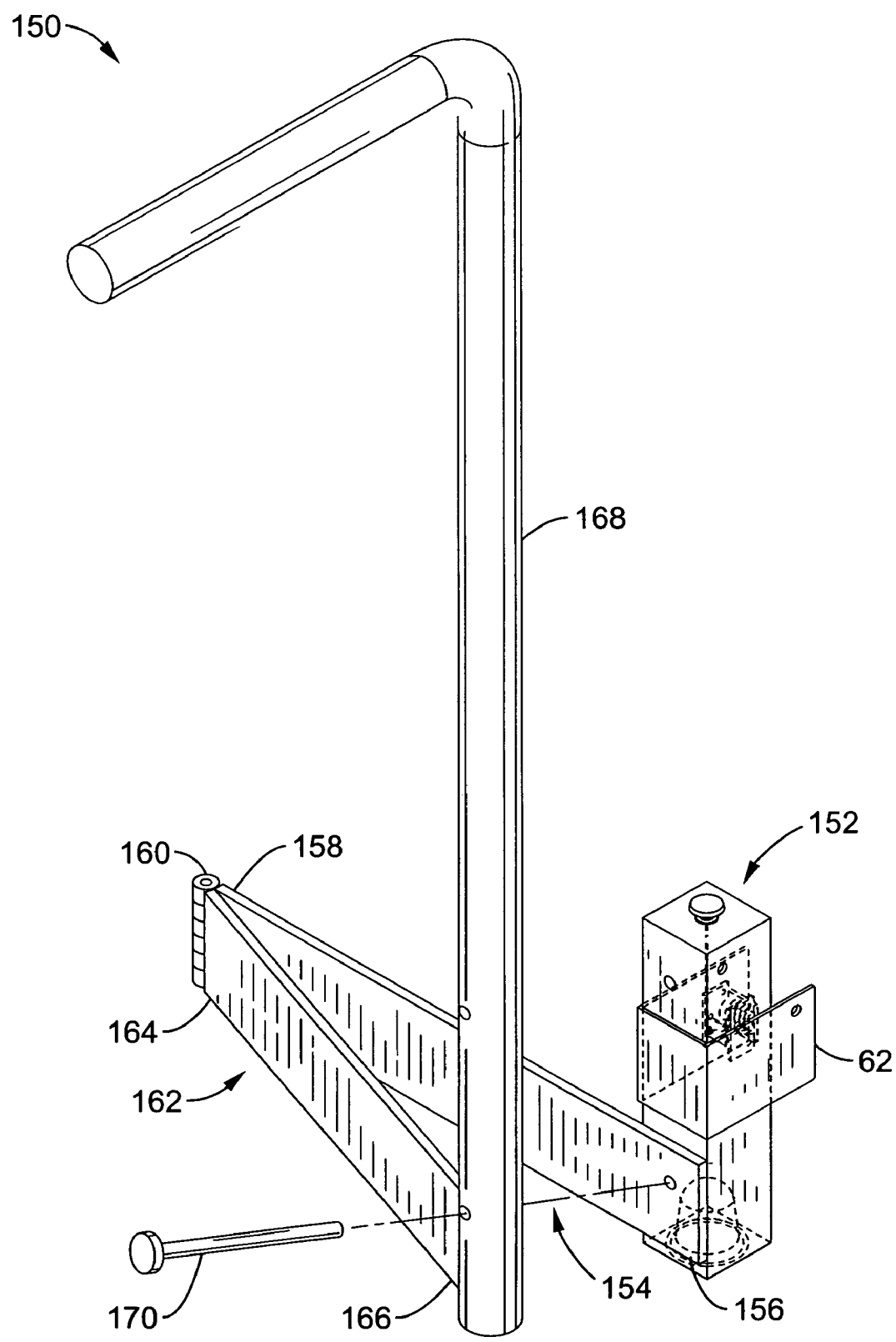
FIG. 7 illustrates an embodiment of the invention configured as a latching swing rack to allow access to the back of a vehicle.

FIG. 7 illustrates a further embodiment of the invention configured as a latching swing rack 150. Latching swing rack 150 has latching rack assembly 152 configured as shown previously in FIG. 1. Base swing bar 154 is coupled at first end 156 to latching rack assembly 152, preferably by welding. Second end 158 of base swing bar 154 is coupled to hinge 160. Articulating swing bar 162 is coupled at first end 164 to hinge 160 and coupled at second end 166 to carrier post 168. Carrier post 168 is configured to carry objects and is releasably coupled to latching rack assembly 152 through lock pins 170 or other conventional and releasable fastening means. Removing lock pins 170 allows carrier post 168 to swing out on articulating swing bar 162 to allow convenient access to a rear hatch door, trunk or tailgate of a vehicle (not shown). Lateral support bracket 62 is adapted to resist the static lateral force of a cantilevered load on carrier post 168 when articulating swing bar 162 is fully extended.

Figure 8:
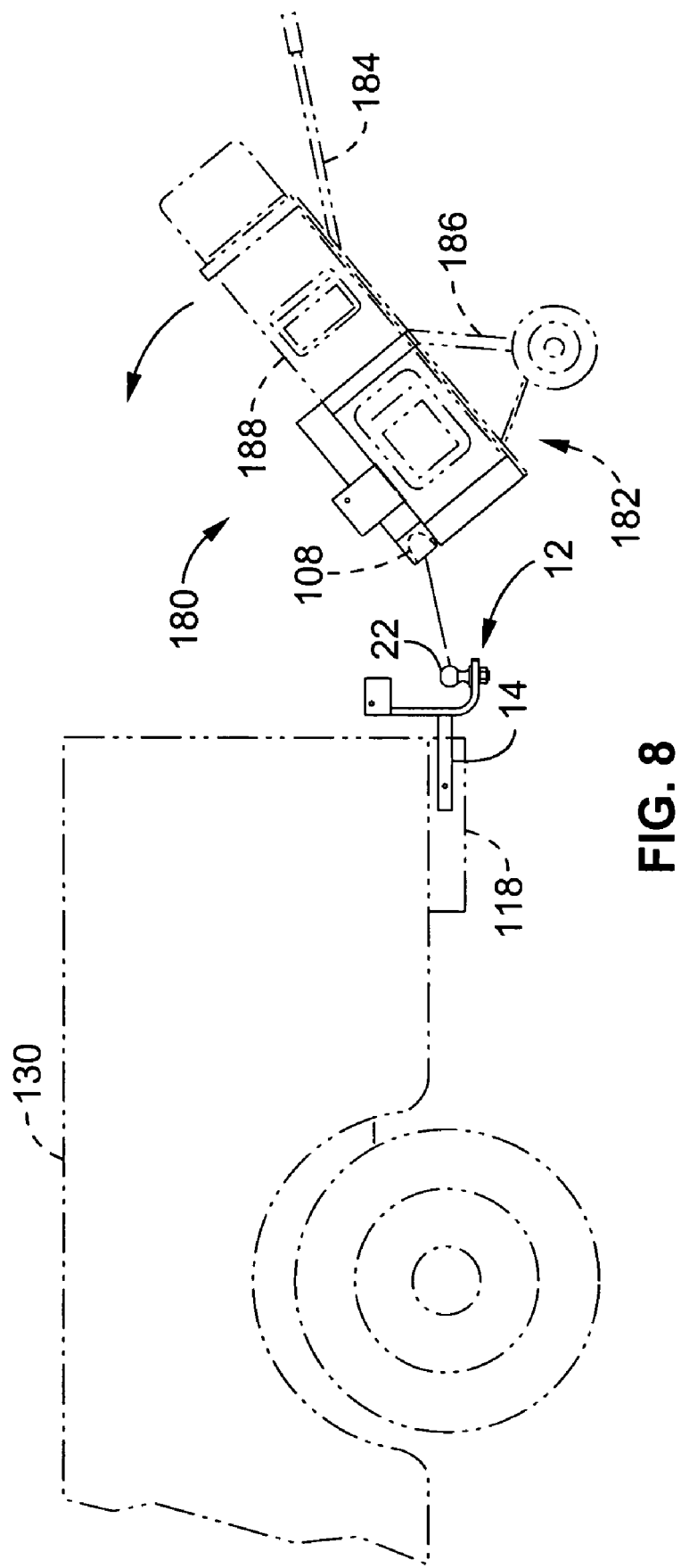
FIG. 8 illustrates an embodiment of the invention configured as a latching rack integrated into a golf bag cart.

FIG. 8 illustrates another embodiment of the invention with latching rack assembly 180 coupled to a golf bag cart 182. Golf bag cart 182 has folding handle 184 and folding wheel assembly 186 to support golf bag 188 during a game of golf. Latching rack assembly 180 is integrated at the bottom front of golf bag cart 182 and opposite handle 184. User approaches rack platform 12 with golf bag cart 182 and pushes handle 184 down to elevate and align ball cup 108 on latching rack assembly 180 with hitch ball 22. Once ball cup 108 is seated on hitch ball 22, handle 184 is elevated towards vehicle 130 lifting golf bag cart 182 until latching rack assembly 180 latches to latching rack platform 12 in a manner previously shown in FIG. 4C. Handle 184 and wheel assembly 186 are then folded against golf bag cart 182 in a conventional manner for transport. The user and the interior of vehicle 130 does not have to be exposed to dirt, grass or wetness on golf bag cart 182 as a result of adverse conditions during a golf game. A protective cover (not shown) can be placed over golf bag cart 182 for protection from the environment and security during transport. In a further embodiment (see FIG. 16), latching rack platform 12 is configured to accommodate two or more latching rack assemblies 180, each adapted to couple to a golf bag cart 102. In a yet further embodiment (not shown), a modified latching rack platform is mounted on a stand or garage wall to accommodate latching rack assembly 180 and store golf bag cart 182 securely and efficiently.

Figure 9A:
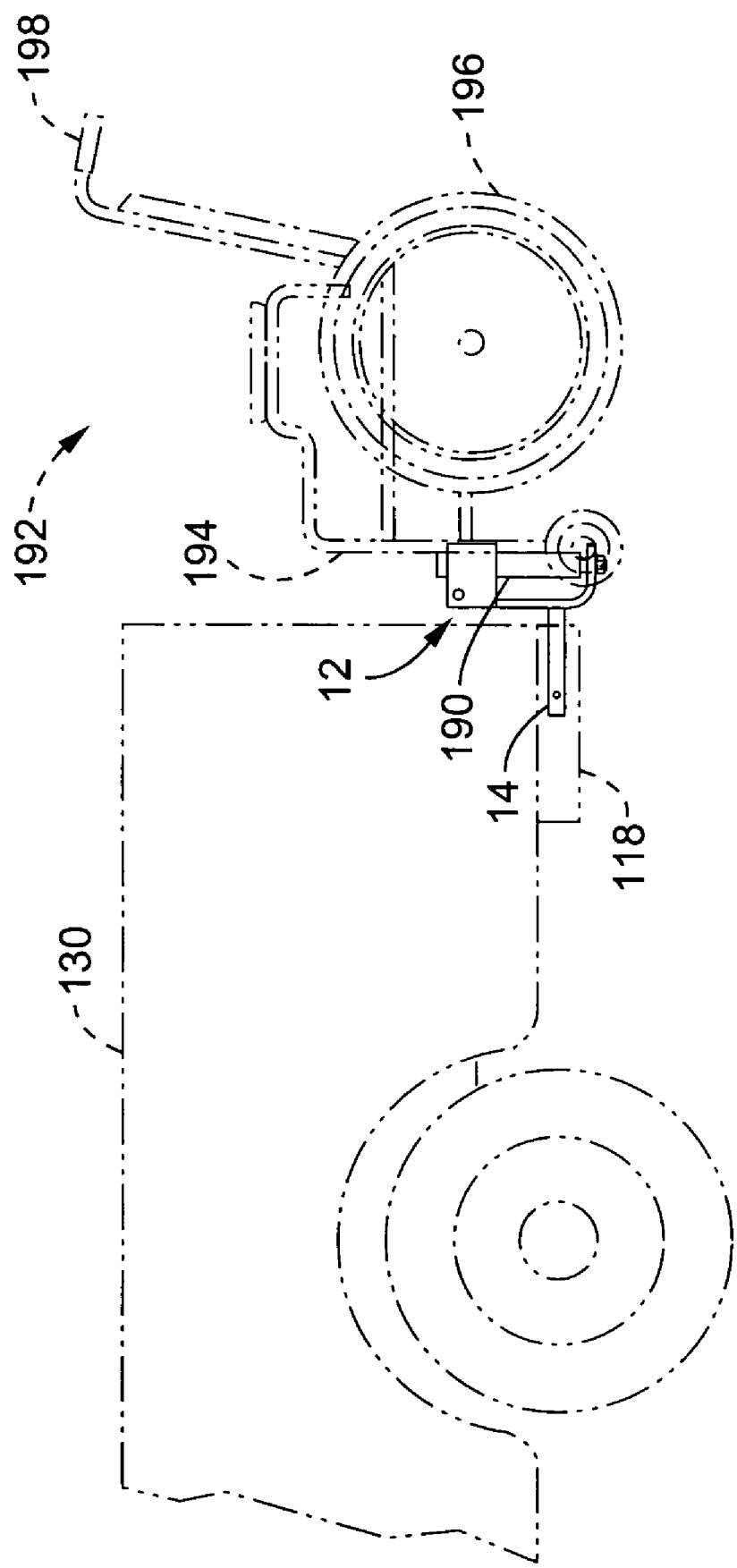
FIG. 9A illustrates an embodiment of the invention configured as a latching rack integrated into a wheel chair.

FIG. 9A illustrates another embodiment of the invention with latching rack assembly 190 configured to carry a wheel chair 192. Latching rack assembly 190 is coupled to a front post 194 of wheel chair 192 either at the time of transport or in a hinged or sliding cantilever manner so as to not interfere with normal wheel chair operation. Wheel chair 192 is rotated back on wheels 196 by pushing down on handles 198 to align latching rack assembly 190 with latching rack platform 12 and make initial contact. Handles 198 are then lifted to secure latching rack assembly 190 to latching rack platform 12. The wheel chair can be collapsed in a conventional manner if desired. The user and the interior of vehicle 130 are not subject to exposure to dirt, grass or wetness of wheels 196.

Figure 9B:
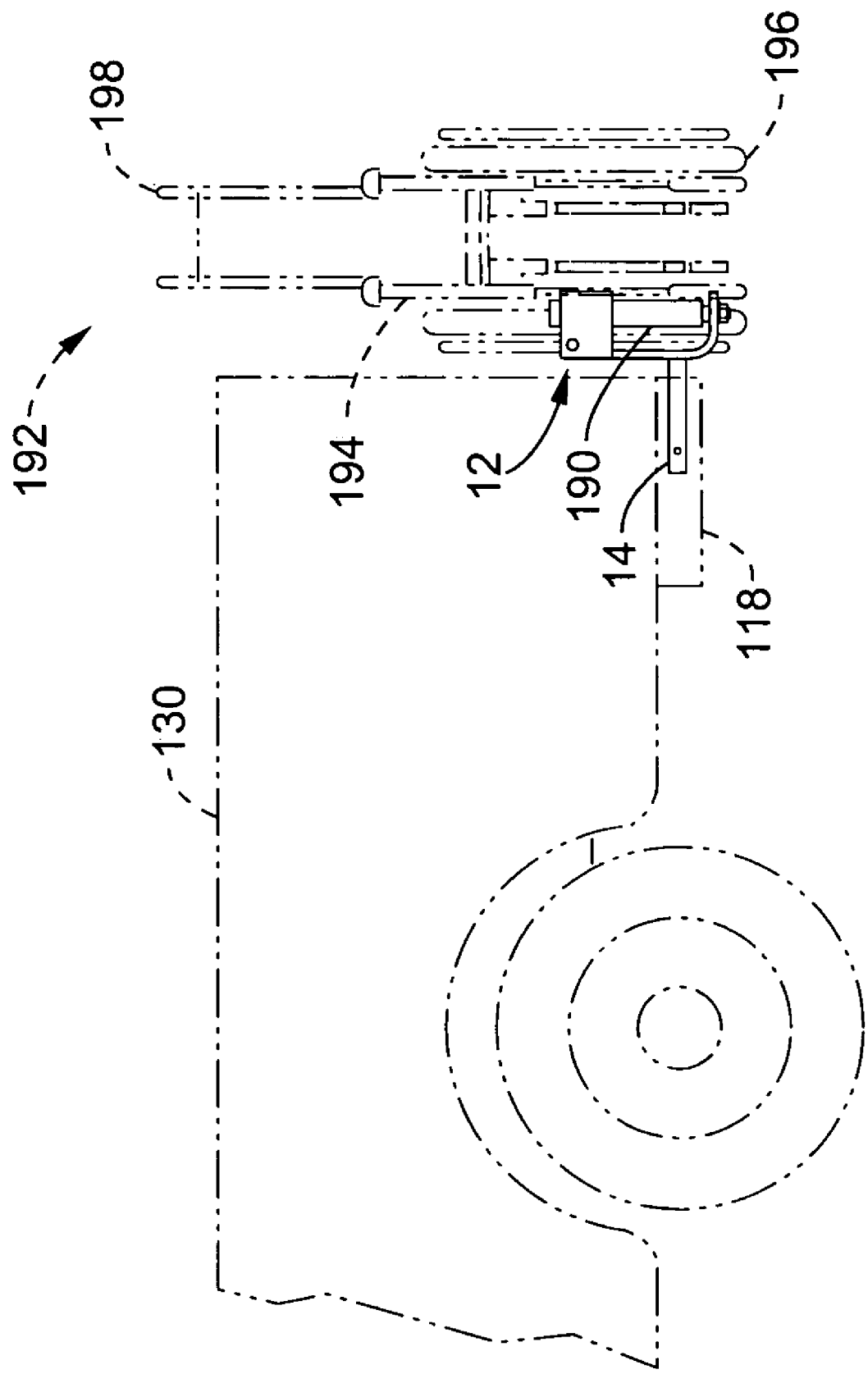
FIG. 9B illustrates the wheel chair with latching rack assembly shown in FIG. 9A rotated sideways and collapsed for transport.

FIG. 9B illustrates the latching rack assembly 190 shown in FIG. 9A rotated on front post 194 so wheelchair 192 is positioned sideways relative to the back of vehicle 130 and collapsed for transport. In another embodiment (not shown) latching rack platform 12 is adapted to receive latching rack assembly 190 from the side of vehicle 130 instead of the rear.

Figure 10:
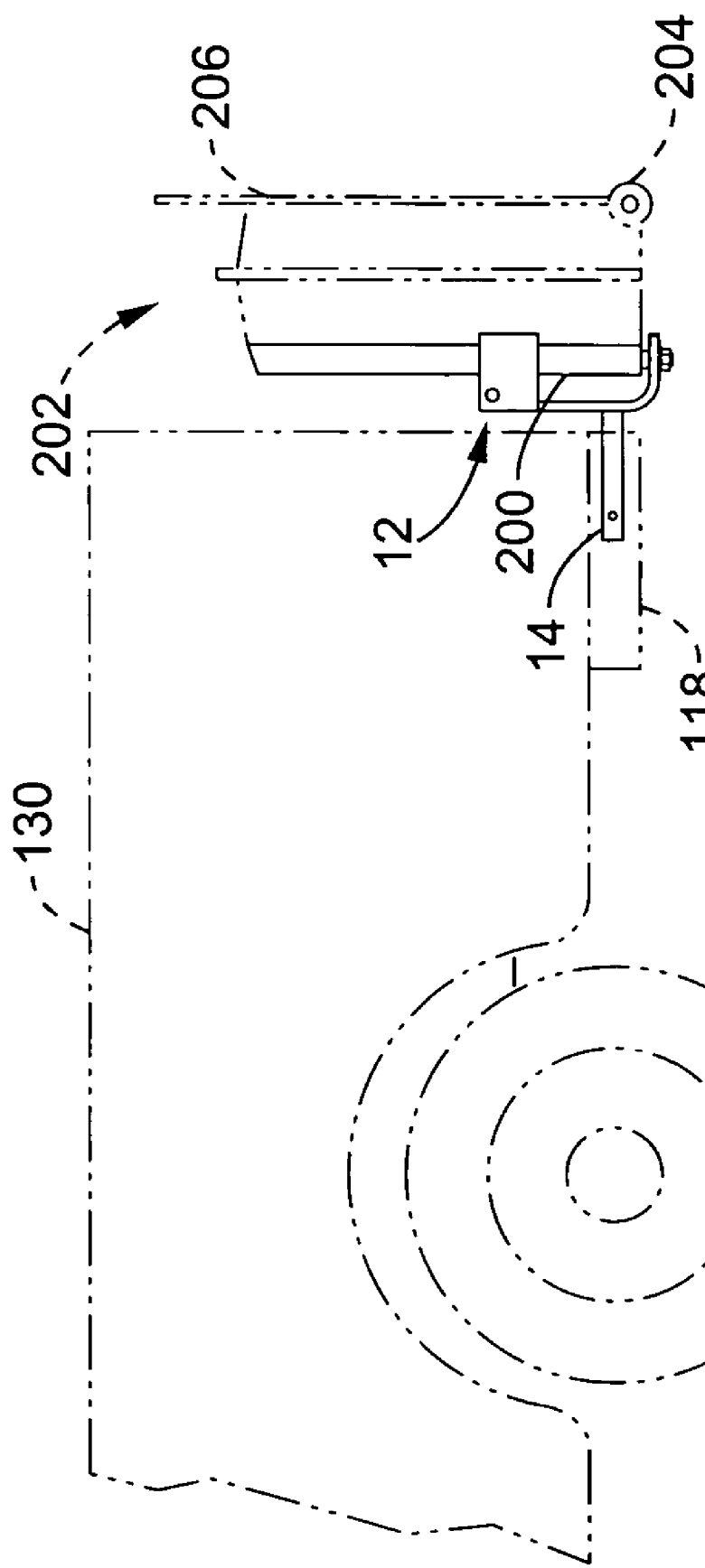
FIG. 10 illustrates an embodiment of the invention configured as a latching rack assembly coupled to a suitcase.

FIG. 10 illustrates another embodiment of the invention with latching rack assembly 200 coupled to a suitcase 202. Wheels 204 and retractable handle 206 can be used to assist coupling latching rack assembly 200 to latching rack platform 12 in a manner discussed previously in FIG. 8.

Figure 11:
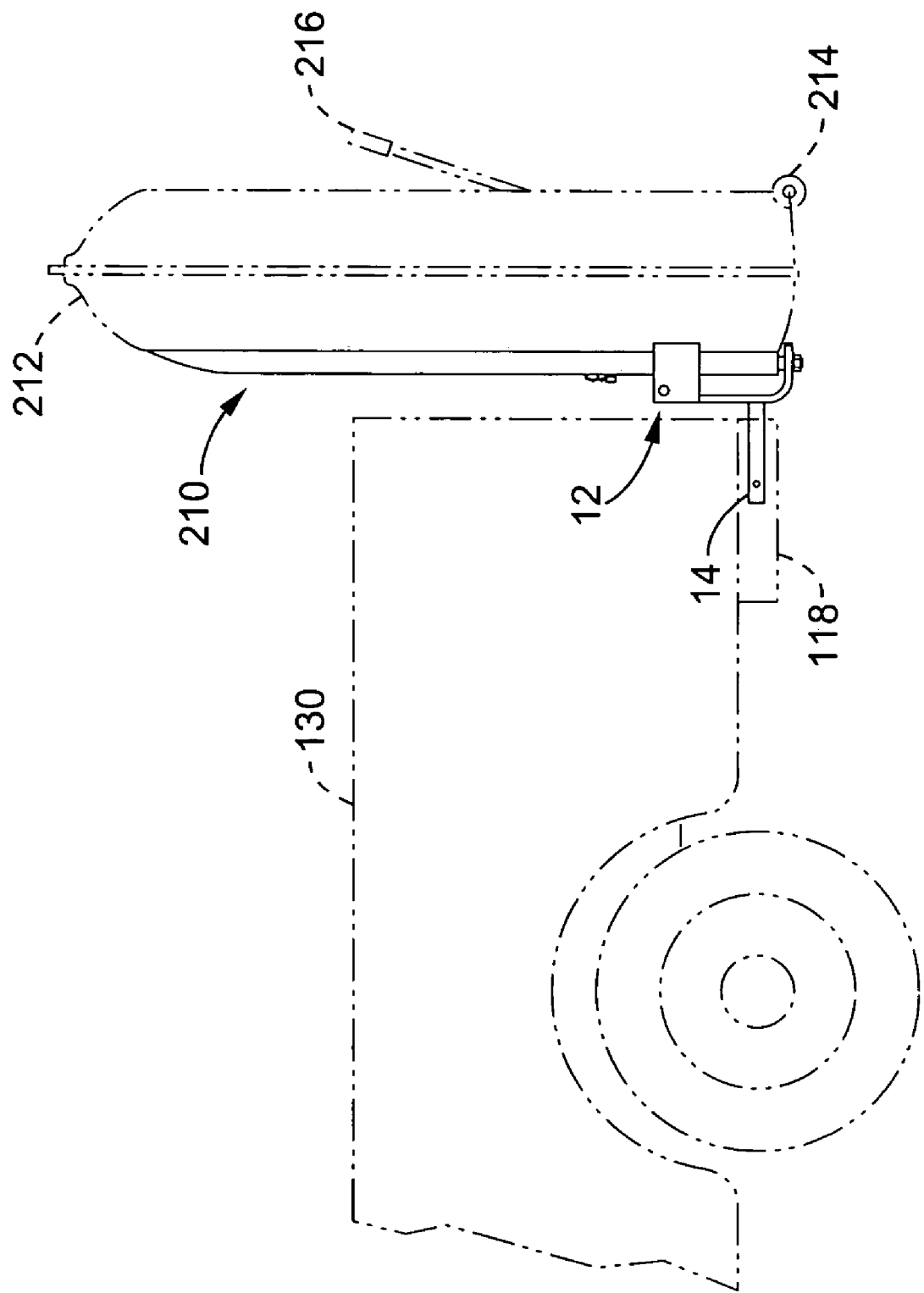
FIG. 11 illustrates an embodiment of the invention configured as a latching rack assembly coupled to a large cargo container.

FIG. 11 illustrates a further embodiment of the invention with latching rack assembly 210 attached to a cumbersome cargo container 212, similar in volume to a cargo container for car roof racks. Cargo container 212 is shown with optional wheels 214 and foldable handle 216 to assist coupling latching rack assembly 210 to latching rack platform 12 in a manner discussed previously in FIG. 8.

Figure 12:
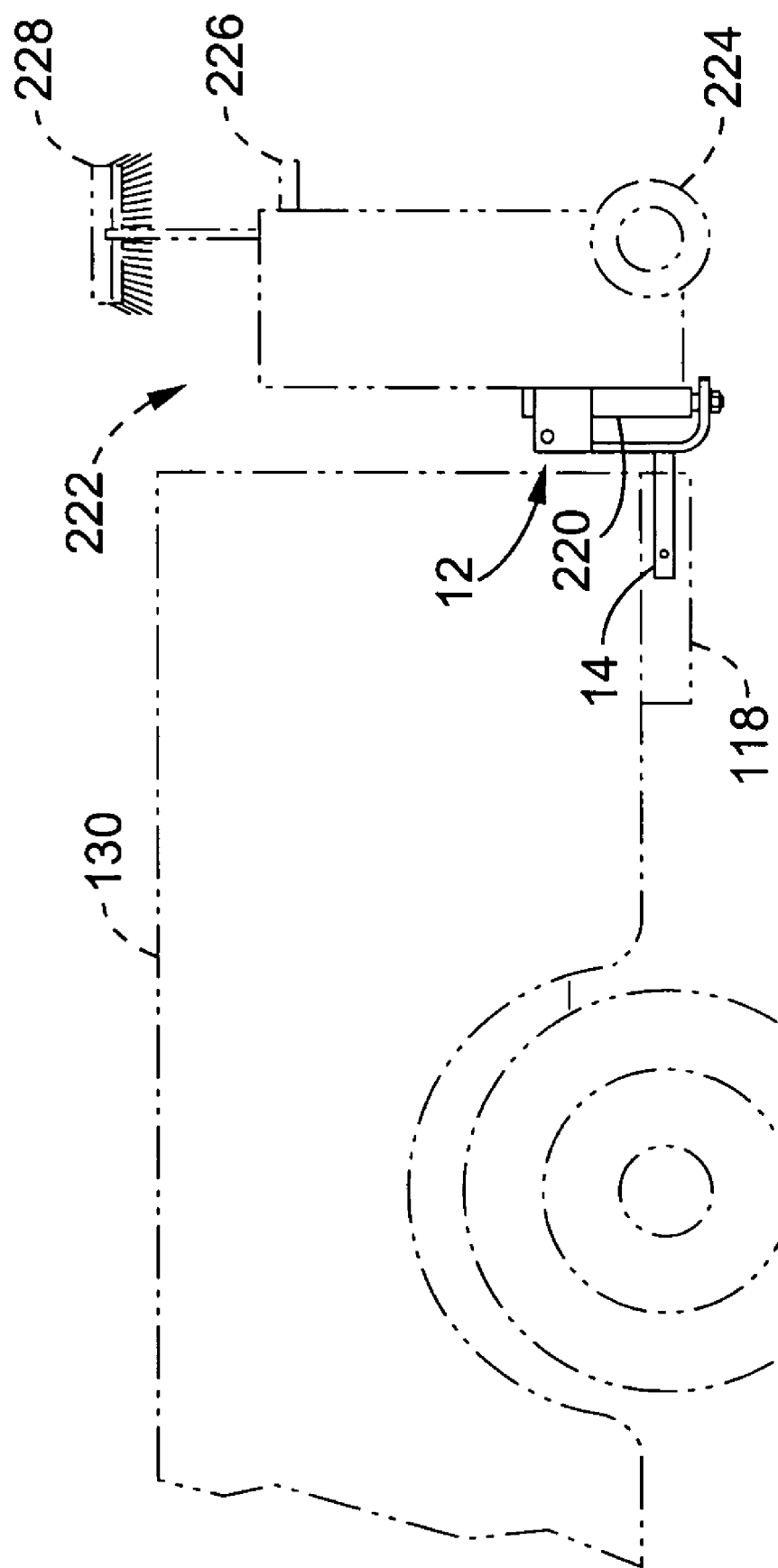
FIG. 12 illustrates an embodiment of the invention configured as a latching rack assembly coupled to an equipment container.

FIG. 12 illustrates another embodiment of the invention with latching rack assembly 220 attached to a equipment container 222. Equipment container 222 is shown with wheels 224, and handle 226 to assist coupling latching rack assembly 220 to latching rack platform 12 in a manner discussed previously in FIG. 8. Equipment container 222 is shown with optional broom 228 and can be mounted and dismounted quickly for alternating use and transport.

Figure 13:
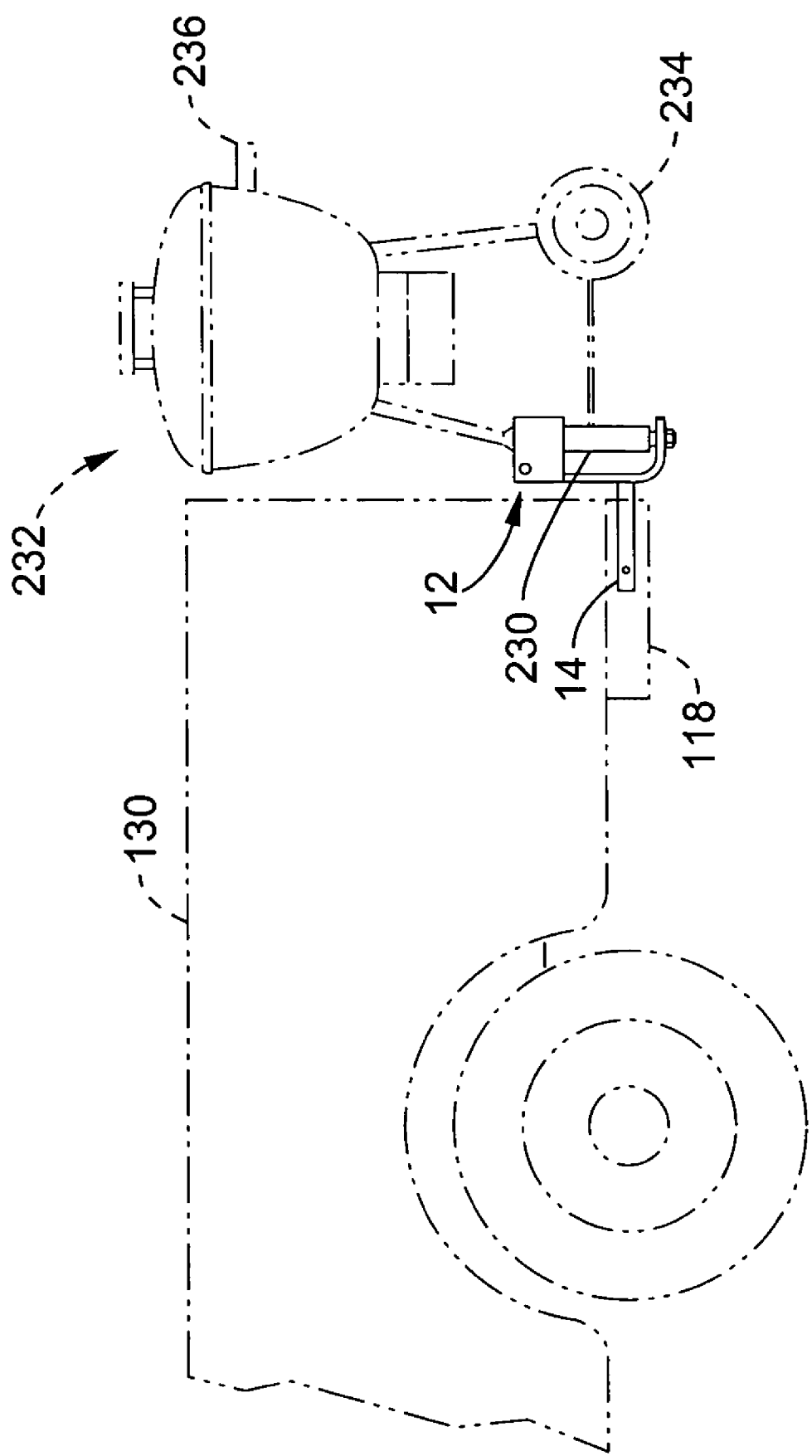
FIG. 13 illustrates an embodiment of the invention configured as a latching rack assembly incorporated into a cooking grill.

FIG. 13 illustrates a further embodiment of the invention with latching rack 230 incorporated into a cooking grill 232 such as would be desired in a parking lot before a sports event. Cooking grill 232 is shown with wheels 234 and handle 236 to assist coupling latching rack assembly 220 to latching rack platform 12 in a manner discussed previously in FIG. 8. Cooking grill 232 is conveniently transported without exposing the interior of vehicle 130 or occupants to ash, grease, hot coals or soot. When detached, cooking grill 232 can be moved in a conventional manner.

Figure 14:
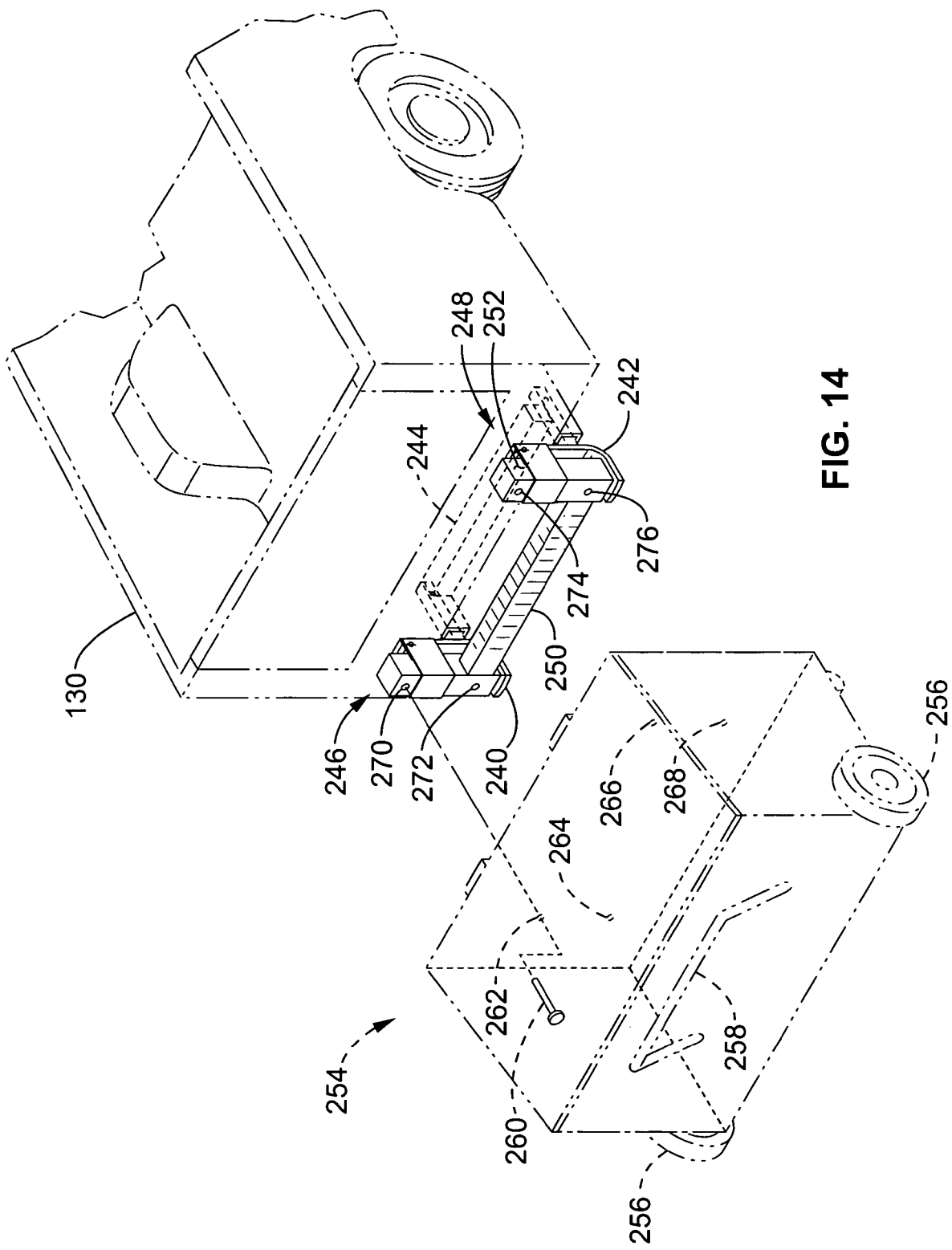
FIG. 14 illustrates an embodiment of the invention configured with dual latching rack assemblies coupled to a utility cart and adapted to latch to dual latching rack platforms inserted in a dual receiver hitch.

FIG. 14 illustrates an embodiment of the invention with dual latching rack platforms 240, 242 coupled with a dual receiver hitch 244, shown in phantom, installed on vehicle 130. Dual latching rack assemblies 246, 248 are coupled together with cross tube 250 for strength and coordinated latching. Cross tube 250 also serves as a conduit to connect the latching releases (see FIG. 1) in latching rack assemblies 246, 248 for convenient positioning of a single latch trigger 252 on latching rack assembly 248. A heavy object, such as a utility cart 254 with wheels 256 and handle 258, is coupled to dual latching rack assemblies 246, 248 with locking pins 260 that secures utility cart 254 to dual latching rack assemblies 246, 248 through aligned apertures, 262, 264, 266 268 in utility cart 254 and apertures 270, 272, 274, 276 in dual latching rack assemblies 246, 248. Other coupling means known in the art may be used to couple utility cart 254 with dual latching rack assemblies 246, 248. Latching rack assemblies 246, 248 couple simultaneously to latching rack platforms 240, 242 in a manner discussed previously in FIG. 8. In another embodiment (not shown) two latching rack platforms 240, 242 are coupled together and to a single shank for mounting in a single receiver. Latching rack assemblies 246, 248 are coupled simultaneously to latching rack platforms 240, 242 in a manner discussed previously.

Figure 15:
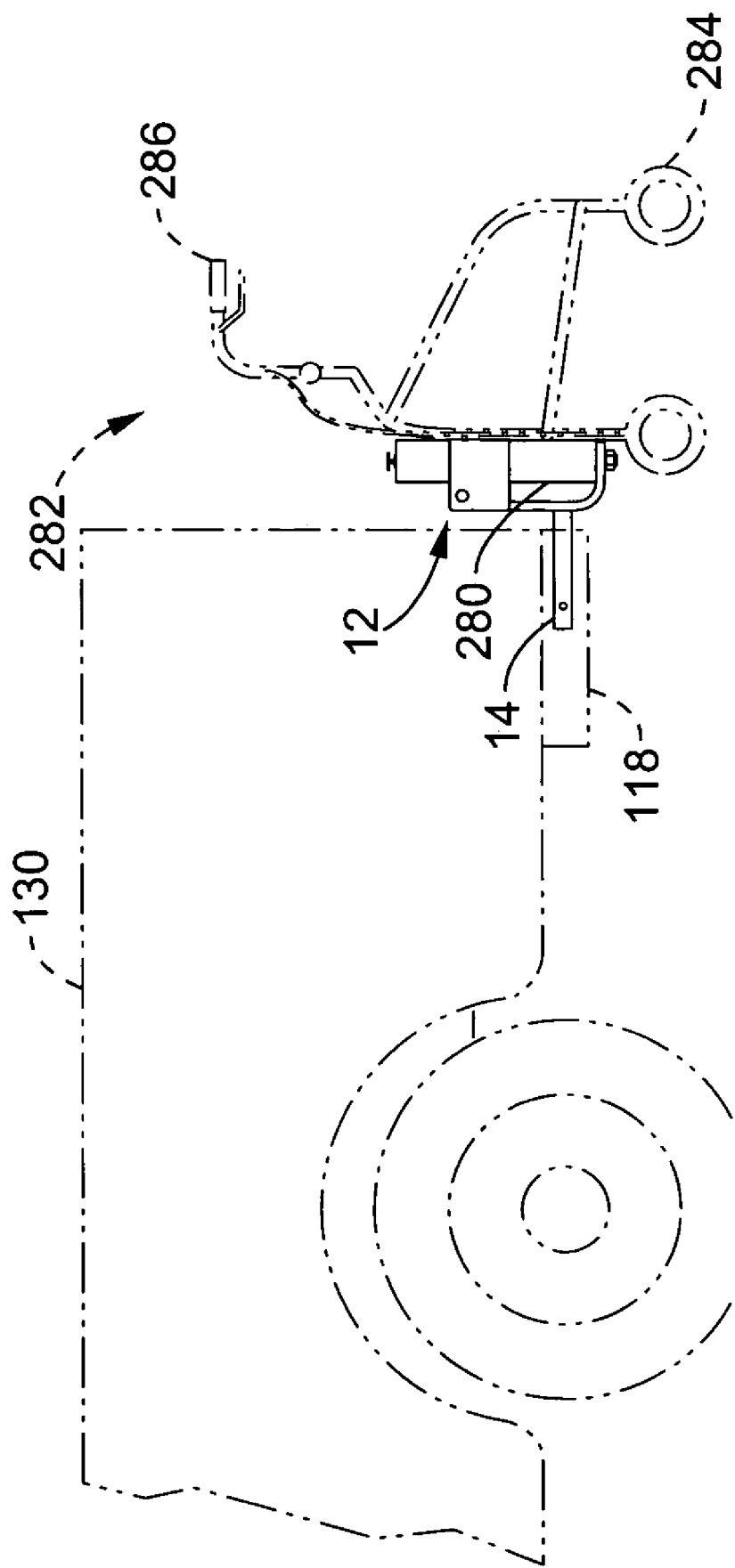
FIG. 15 illustrates an embodiment of the invention configured as a latching rack assembly incorporated into a walking assist device.

FIG. 15 illustrates a latching rack assembly 280 integrated in a walking aid device 282. Rear wheels 284 and handle 286 are used to assist coupling latching rack assembly 280 to latching rack platform 12 as discussed previously in FIG. 8. Walking aid device 282 can be conveniently mounted and dismounted without touching latching rack platform 12.

Figure 16:
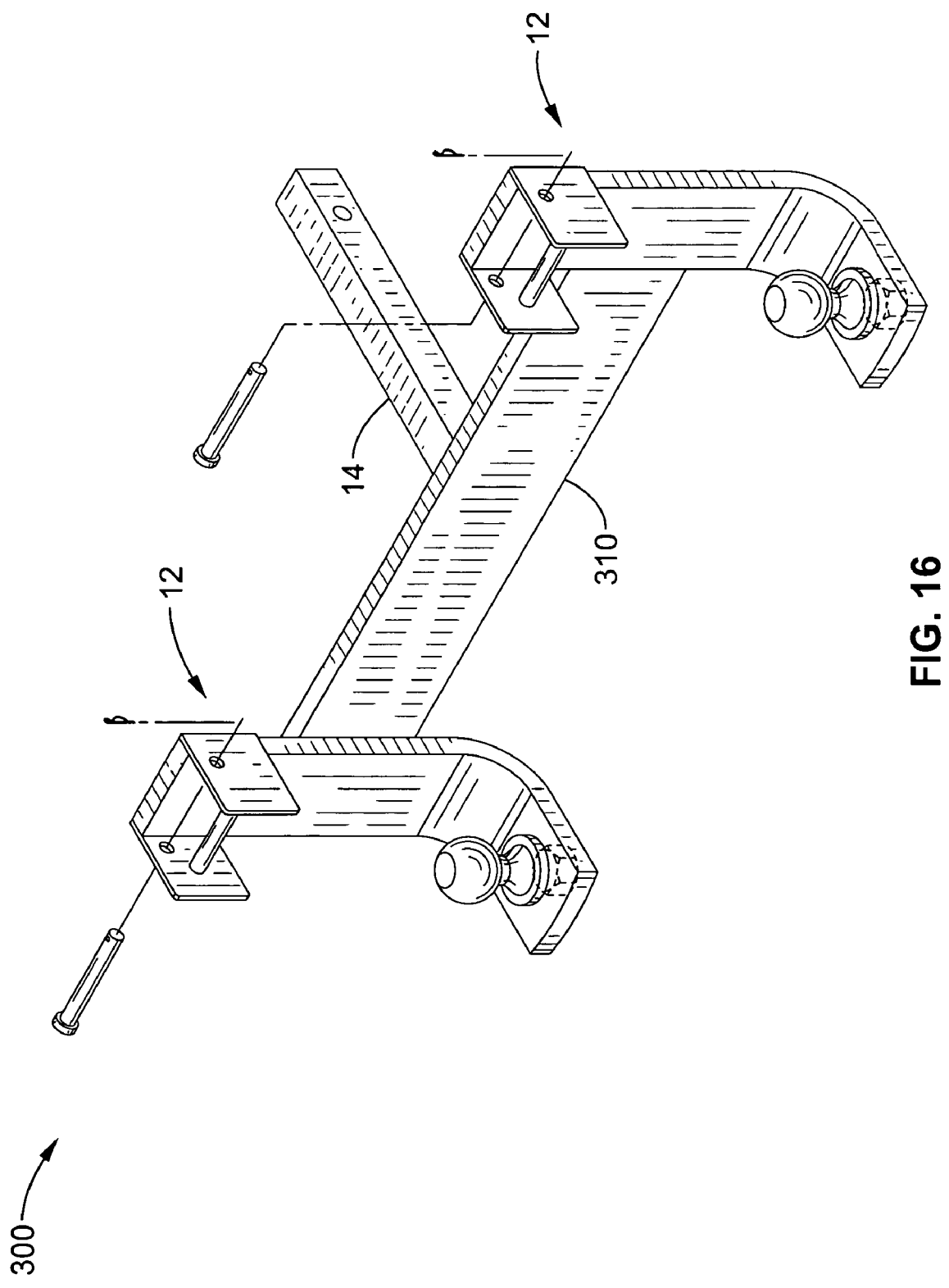
FIG. 16 illustrates an embodiment of a dual latching rack platform.

FIG. 16 illustrates an embodiment of a dual latching rack platform 300. Dual latching rack platform 300 consists of two latching rack platforms 12 as previously shown in FIG. 1 coupled with a cross bar 310, preferably by welding. Cross bar 310 is coupled in the center to one shank 14 configured for a standard hitch receiver (not shown). In use, two latching rack assemblies (shown in FIG. 1) can be carried by dual latching rack platform 300. This embodiment is best suited for two light loads such as two golf bag carts (similar to FIG. 8) or two suitcases (similar to FIG. 10). A medium and balanced load, integrated with two latching rack assemblies coupled together in a manner similar to FIG. 14, can be mounted on dual latching rack platform 300. One exemplary embodiment (not shown) is a double post bike rack mounted in a manner similar to FIG. 5.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A latching rack system for supporting objects and configured to couple to a hitch receiver on a vehicle comprising:
    a latching rack platform;
    an object support structure;
    said latching rack platform configured for coupling to said hitch receiver;
    said latching rack platform including lateral support means for providing lateral support to said object support structure;
    said object support structure including latching means for releasably coupling said object support structure to lateral support means;
    a hitch ball coupled to said latching rack platform;
    a hitch ball cup coupled to said object support structure;
    wherein said hitch ball cup is adapted to pivot on said hitch ball;
    a support mast coupled to said latching rack platform;
    two lateral support flanges coupled to said support mast in a generally vertical configuration; and
    a striker pin permanently mounted to said lateral support flanges;
    wherein said latching means is configured to engage said striker pin upon contact;
    wherein said object support structure is configured to pivot on said hitch ball between a generally horizontal orientation and a generally vertical orientation; and
    wherein said latching means engages said striker pin upon contact with said striker pin when said hitch ball cup is positioned on said hitch ball and said object support structure is pivoted to a generally vertical orientation aligned with said lateral support flanges.

2. A latching rack system as recited in claim 1, wherein said latching means comprises:
    at least one latch device positioned on said object support structure to align with said lateral support means;
    said latch device adapted to releasably couple to said lateral support means when said object support structure is positioned on said hitch ball in a configuration for carrying objects; and
    a latch release coupled to said latch device and configured to release said latch device from said lateral support means.

3. A latching rack system as recited in claim 2, wherein said latching means further comprises at least two latching devices.

4. A latching rack system as recited in claim 1, further comprising:
    an alignment slot, said alignment slot positioned in said hitch ball cup;
    wherein said hitch ball has a neck;
    wherein said alignment slot engages the neck of said hitch ball when said hitch ball cup is positioned on said hitch ball and said object support structure is oriented in a generally horizontal orientation; and
    wherein said alignment slot disengages from the neck of said hitch ball when said object support structure is pivoted on said hitch ball to a generally vertical orientation.

5. A latching rack system as recited in claim 1, wherein said object support structure has a circular cross section.

6. A latching rack system as recited in claim 1, wherein said object support structure has a rectangular cross section.

7. A latching rack system for supporting objects and configured to couple to a hitch receiver on a vehicle comprising:
    a latching rack platform; and
    an object support structure;
    said latching rack platform configured for coupling to said hitch receiver;
    said latching rack platform including lateral support means for providing lateral support to said object support structure;
    said object support structure including latching means for releasbly coupling said object support structure to lateral support means;
    wherein said object support means further comprises:
        an elongated body, said body having a first end and a second end, said first end coupled to said hitch ball cup;
        said second end of said elongated body adapted to carry objects; and
        a lateral support bracket, said support bracket coupled to said elongated body in a parallel and generally vertical configuration;
        wherein said support bracket is positioned to align with said lateral support means when said hitch ball cup is positioned on said hitch ball and said lateral support bracket is releasably coupled to said lateral support means; and
    wherein said hitch ball cup is adapted to be interchangeable.

8. A latching rack system as recited in claim 1, wherein said object support structure is adapted to carry objects selected from the group consisting essentially of a bicycle, a pair of skis, a snowboard, a golf bag cart, a wheel chair, a walker, a suitcase, a cargo carrier, a equipment container, a cooking grill, and a utility cart.

9. A latching rack system as recited in claim 1, wherein the hitch receiver is configured to accommodate two latching rack platforms;
   wherein two object support structures are coupled together and adapted to mate with said two latching rack platforms; and
   wherein said two object support structures are configured for supporting objects when simultaneously coupled to said two latching rack platforms.

10. A latching rack system for supporting objects and configured to couple to a hitch receiver on a vehicle comprising:
   a latching rack platform; and
   an object support structure;
   said latching rack platform configured for coupling to said hitch receiver;
   said latching rack platform including a lateral support structure configured to provide lateral support to said object support structure;
   said object support structure including a latch mechanism configured to releasably couple said object support structure to said lateral support structure;
   a hitch ball coupled to said latching rack platform;
   a hitch ball cup coupled to said object support structure;
   wherein said hitch ball cup is configured to engage hitch balls having a range of diameters;
   wherein said range of hitch ball diameters is from approximately 1⅞ inches to approximately 2 5/16 inches;
   two lateral support flanges coupled to said lateral support structure in a generally vertical configuration;
   a striker pin permanently mounted to said lateral support flanges;
   wherein said latching mechanism engages said striker pin upon contact.

11. A latching rack system as recited in claim 10, wherein said latch mechanism comprises:
   at least one latch device positioned on said object support structure to align with said lateral support structure;
   said latch device adapted to releasably couple to said lateral support structure when said object support structure is positioned on said hitch ball in a configuration for carrying objects; and
   a latch release coupled to said latch device and configured to release said latch device from said lateral support structure.

12. A latching rack system as recited in claim 11, wherein said latch mechanism further comprises at least two latching devices.

13. A latching rack system recited in claim 10, further comprising:
   an alignment slot, said alignment slot positioned in said hitch ball cup;
   wherein said hitch ball has a neck;
   wherein said alignment slot engages the neck of said hitch ball when said hitch ball cup is positioned on said hitch ball and said object support structure is oriented in a generally horizontal orientation; and
   wherein said alignment slot disengages from the neck of said hitch ball when said object support structure is pivoted on said hitch ball to a generally vertical orientation.

14. A latching rack system as recited in claim 10, wherein said object support structure has a circular cross section.

15. A latching rack system as recited in claim 10, wherein said object support structure has a rectangular cross section.

16. A latching rack system for supporting objects and configured to couple to a hitch receiver on a vehicle comprising:
   a latching rack platform; and
   an object support structure;
   said latching rack platform configured for coupling to said hitch receiver;
   said latching rack platform including a lateral support structure configured to provide lateral support to said object support structure;
   said object support structure including a latch mechanism configured to releasbly couple said object support structure to lateral support structure;
   wherein said object support structure comprises:
   a hitch ball cup adapted to fit on an upper portion of said hitch ball;
   wherein said object support structure is configured for supporting an object when said latching rack platform is coupled to said hitch receiver, said hitch ball cup is positioned on said hitch ball, and said latch mechanism is coupled to said lateral support structure,
   wherein said object support structure further comprises:
   an elongated body, said body having a first end and a second end, said first end coupled to said hitch ball cup;
   said second end of said elongated body adapted to carry objects; and
   a lateral support bracket, said support bracket coupled to said elongated body in a parallel and generally vertical configuration;
   wherein said support bracket is positioned to align with said lateral support structure when said hitch ball cup is positioned on said hitch ball and said lateral support bracket is releasably coupled to said lateral support structure; and
   wherein said hitch ball cup is adapted to be interchangeable.

17. A latching rack system as recited in claim 10, wherein said object support structure is further adapted to carry objects selected from the group consisting essentially of a bicycle, a pair of skis, a snowboard, a golf bag cart, a wheel chair, a walker, a suitcase, a cargo carrier, a equipment container, a cooking grill, and a utility cart.

18. A latching rack system as recited in claim 10, wherein the hitch receiver is configured to accommodate two latching rack platforms;
   wherein two object support structures are coupled together and adapted to mate with said two latching rack platforms; and
   wherein said two object support structures are configured for supporting objects when simultaneously coupled to said two latching rack platforms.

19. An improved rack system for supporting objects on a hitch rack post adapted to couple to a hitch ball on a hitch ball platform that is further coupled to a hitch receiver on a vehicle, the improvement comprising:
   a hitch ball platform;
   a support mast coupled to the hitch ball platform;
   said support mast oriented generally vertically above the hitch ball platform,
   two lateral support flanges coupled to said support mast in a generally parallel and generally vertical configuration;
   a latch pin coupled to and positioned between said lateral support flanges;
   a hitch rack post;
   said hitch rack post having a first end and a second end, said first end of said hitch rack post configured for carrying objects;
   a hitch ball cup positioned at said second end of the hitch rack post;
   said hitch ball cup adapted to pivot on said hitch ball;
   at least one latch device coupled to said hitch rack post;

said latch device positioned to align with said latch pin;
said latch device adapted to releasably engage said latch pin;
a latch release coupled to said latch device;
said latch release adapted to disengage said latch device from said latch pin;
a lateral support bracket, said lateral support bracket coupled to said hitch rack post;
said lateral support bracket configured as parallel generally vertical plates;
said lateral support bracket further adapted to slidingly mate with said lateral support flanges;
wherein said improved hitch rack post is configured to pivot on said hitch ball between a generally horizontal orientation and a generally vertical orientation;
wherein said lateral support bracket is positioned to align with said lateral support flanges when said hitch ball cup is positioned on the hitch ball and the improved hitch rack post is oriented in a vertical plane intersecting the hitch ball and said support mast; and
wherein the improved hitch rack post is configured for supporting objects when the improved hitch ball platform is coupled to the hitch receiver, said hitch ball cup is positioned on the hitch ball, and said latch device is releasably coupled to said latch pin.

20. An improved rack system as recited in claim 19, further comprising:
two latch devices, said latch devices coupled to said hitch rack post; and
said latch devices positioned to align with said latch pin.

21. An improved rack system as recited in claim 19, further comprising:
an alignment slot, said alignment slot positioned in said hitch ball cup;
wherein said hitch ball has a neck;
wherein said alignment slot engages the neck of said hitch ball when said hitch ball cup is positioned on said hitch ball and said hitch rack post is oriented in a generally horizontal orientation; and
wherein said alignment slot disengages from the neck of said hitch ball when said hitch rack post is pivoted on said hitch ball to a generally vertical orientation.

22. An improved rack system as recited in claim 19, wherein said hitch rack post has a circular cross section.

23. An improved rack system as recited in claim 19, wherein said hitch rack post has a rectangular cross section.

24. An improved rack system for supporting objects on a hitch rack post adapted to couple to a hitch ball on a hitch ball platform that is further coupled to a hitch receiver on a vehicle, the improvement comprising:
a hitch ball platform;
a support mast coupled to the hitch ball platform;
said support mast oriented generally vertically above the hitch ball platform,
two lateral support flanges coupled to said support mast in a generally parallel and generally vertical configuration;
a latch pin coupled to and positioned between said lateral support flanges;
a hitch rack post;
said hitch rack post having a first end and a second end, said first end of said hitch rack post configured for carrying objects;
a hitch ball cup positioned at said second end of the hitch rack post;
said hitch ball cup adapted to mate with said hitch ball;
at least one latch device coupled to said hitch rack post;
said latch device positioned to align with said latch pin;
said latch device adapted to releasably engage said latch pin;
a latch release coupled to said latch device;
said latch release adapted to disengage said latch device from said latch pin;
a lateral support bracket, said lateral support bracket coupled to said hitch rack post;
said lateral support bracket configured as parallel generally vertical plates;
said lateral support bracket further adapted to slidingly mate with said lateral support flanges;
wherein said lateral support bracket is positioned to align with said lateral support flanges when said hitch ball cup is positioned on the hitch ball and the improved hitch rack post is oriented in a vertical plane intersecting the hitch ball and said support mast;
wherein the improved hitch rack post is configured for supporting objects when the improved hitch ball platform is coupled to the hitch receiver, said hitch ball cup is positioned on the hitch ball, and said latch device is releasably coupled to said latch pin; and
wherein said hitch ball cup is adapted to be interchangeable.

25. An improved rack system as recited in claim 19, wherein the hitch receiver is configured to accommodate two hitch ball platforms;
wherein two hitch rack posts are coupled together and adapted to mate with said two hitch ball platforms; and
wherein said two hitch rack posts are configured for supporting objects when simultaneously coupled to said two hitch ball platforms.

26. An improved rack system as recited in claim 19, wherein said second end of said hitch rack post is further adapted to carry objects selected from the group consisting essentially of a bicycle, a pair of skis, a snowboard, a golf bag cart, a wheel chair, a walker, a suitcase, a cargo carrier, a equipment container, a cooking grill, and a utility cart.

27. A method of mounting a latching rack system for supporting objects and configured to couple to a vehicle hitch receiver, comprising;
providing a latching rack platform having a shank, a hitch ball, a support mast and a lateral support base coupled to said support mast;
coupling said latching rack platform to the vehicle hitch receiver;
providing a latching rack assembly comprising an elongate body having a hitch ball cup, a latching device and a lateral support bracket;
positioning said hitch ball cup on said hitch ball;
pivoting said elongated body on said hitch ball from a generally horizontal orientation to a generally vertical position;
aligning said lateral support bracket with said lateral support base;
orienting said latch rack assembly to a position on said hitch ball for supporting objects; and
latching said latching device to said lateral support base.

28. A latching rack system as recited in claim 1:
wherein said hitch ball cup is configured to engage hitch balls having a range of diameters; and
wherein said range of hitch ball diameters is from approximately 1⅞ inches to approximately 2 5/16 inches.

* * * * *